(12) United States Patent
Komori

(10) Patent No.: US 11,062,633 B2
(45) Date of Patent: Jul. 13, 2021

(54) OPTICAL SCANNER, DISPLAY SYSTEM, MOBILE OBJECT, OPTICAL SCANNING CONTROL METHOD, AND RECORDING MEDIUM STORING PROGRAM CODE

(71) Applicant: Takumi Komori, Kanagawa (JP)

(72) Inventor: Takumi Komori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 31 days.

(21) Appl. No.: 16/706,851

(22) Filed: Dec. 9, 2019

(65) Prior Publication Data
US 2020/0226963 A1 Jul. 16, 2020

(30) Foreign Application Priority Data

Jan. 15, 2019 (JP) .............................. JP2019-004028
May 31, 2019 (JP) .............................. JP2019-102671

(51) Int. Cl.
*G09G 5/00* (2006.01)
*G09G 3/02* (2006.01)
(Continued)

(52) U.S. Cl.
CPC ........... *G09G 3/025* (2013.01); *G02B 26/101* (2013.01); *G02B 27/0101* (2013.01);
(Continued)

(58) Field of Classification Search
USPC ...................... 345/7, 204, 207, 213; 348/294
See application file for complete search history.

(56) References Cited

U.S. PATENT DOCUMENTS

| 4,684,996 A | 8/1987 | Baumeister |
| 2005/0057557 A1* | 3/2005 | Kobayashi ........... H04N 5/7491 345/213 |

(Continued)

FOREIGN PATENT DOCUMENTS

| EP | 3267237 A1 | 1/2018 |
| JP | 2003047018 A | 2/2003 |

(Continued)

OTHER PUBLICATIONS

Extended European Search Report dated May 19, 2020, issued in corresponding European Patent Application No. 19210705.0, 7 pages.

*Primary Examiner* — Thuy N Pardo
(74) *Attorney, Agent, or Firm* — Xsensus LLP

(57) ABSTRACT

An optical scanner and an optical scanning control method. The optical scanner includes a light source configured to emit light, a light deflector configured to deflect the light emitted from the light source to scan a scanning area two-dimensionally in a main scanning direction and a sub-scanning direction, and a photodetector configured to detect scanning light deflected by the light deflector to perform scanning on a detection field included in the scanning area. In the scanning area, a detection scanning area is formed by the scanning light so as to include an end of the detection field, and a size of the detection scanning area is changed. The optical scanning control method includes forming a detection scanning area by scanning light so as to include an end of a detection field included in a scanning area that is two-dimensionally scanned, and changing a size of the detection scanning area.

15 Claims, 26 Drawing Sheets

(51) Int. Cl.
  *G02B 26/10* (2006.01)
  *G02B 27/01* (2006.01)
  *G03B 21/28* (2006.01)
  *H04N 9/31* (2006.01)
  *B60K 35/00* (2006.01)

(52) U.S. Cl.
  CPC .......... *G03B 21/28* (2013.01); *H04N 9/3135* (2013.01); *B60K 35/00* (2013.01); *G09G 2380/10* (2013.01)

(56) References Cited

U.S. PATENT DOCUMENTS

| | | | |
|---|---|---|---|
| 2014/0092283 A1* | 4/2014 | Yang | G02B 26/0841 |
| | | | 348/294 |
| 2017/0031266 A1* | 2/2017 | Igarashi | H04N 1/02481 |
| 2017/0154558 A1 | 6/2017 | Atsuumi et al. | |
| 2018/0218713 A1* | 8/2018 | Kusanagi | G02B 27/01 |
| 2019/0084419 A1* | 3/2019 | Suzuki | G09G 3/346 |
| 2019/0097396 A1* | 3/2019 | Sakai | G02B 26/0833 |
| 2019/0187459 A1* | 6/2019 | Matsumaru | G02B 26/101 |
| 2020/0183157 A1* | 6/2020 | Suzuki | G02B 27/01 |

FOREIGN PATENT DOCUMENTS

| | | |
|---|---|---|
| JP | 2015-031782 | 2/2015 |
| JP | 2017-021131 | 1/2017 |
| WO | 2012120589 A1 | 9/2012 |

* cited by examiner

FIG. 5
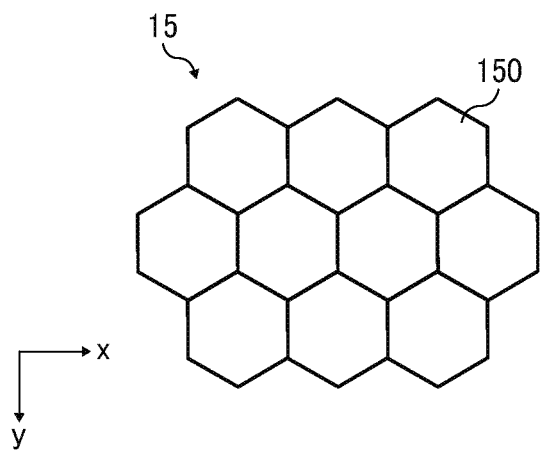
FIG. 6A
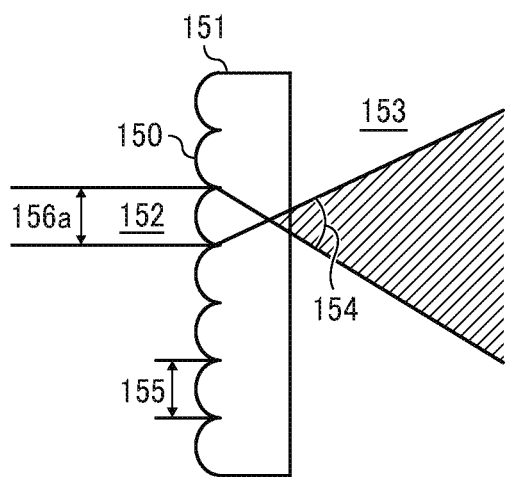
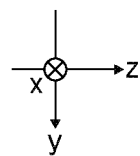
FIG. 6B
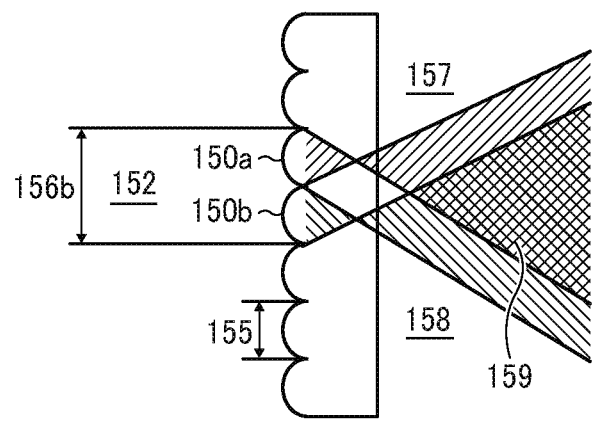
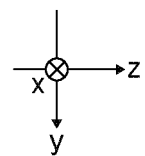

FIG. 12

| TABLE ADDRESS (tbl_adr) | Y-DIRECTIONAL DRIVING-VOLTAGE VALUE |
|---|---|
| 0 | 0 |
| 1 | xxx |
| ... | ... |
| 200 | Ymax |
| ... | ... |
| 1022 | xxx |
| 1023 | 0 |

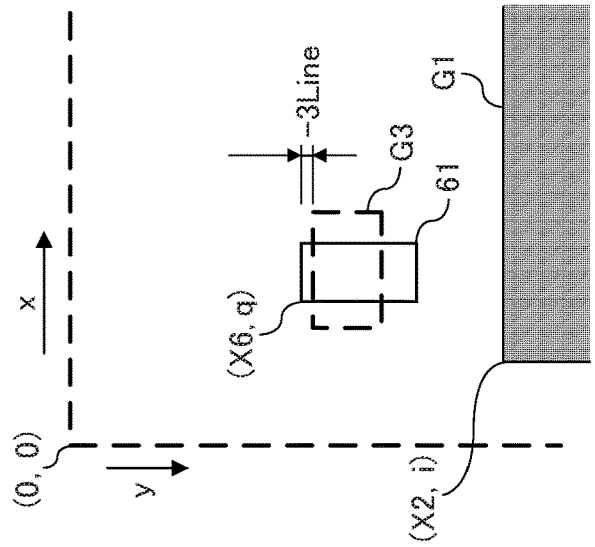
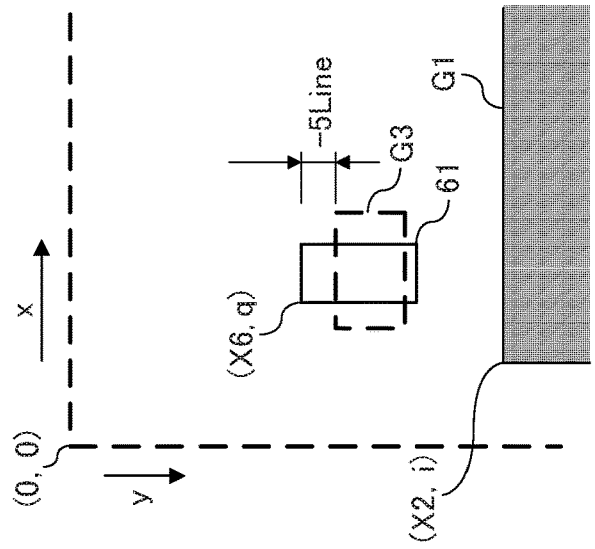
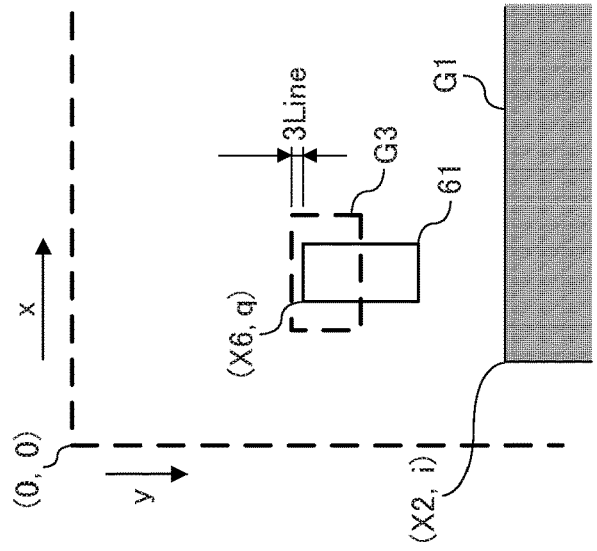

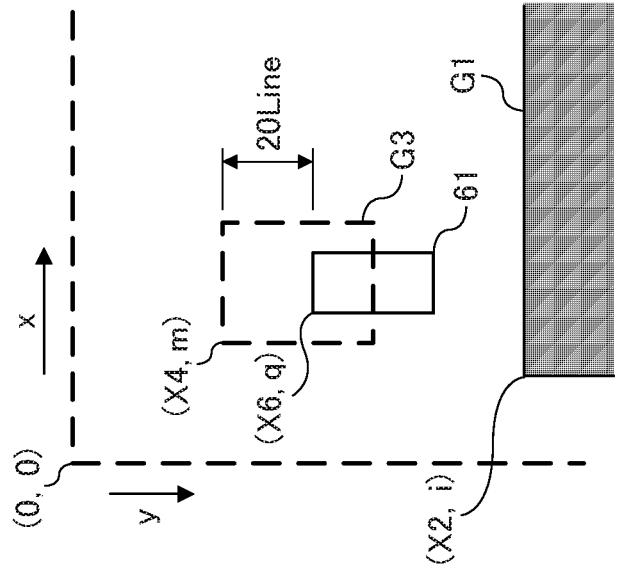
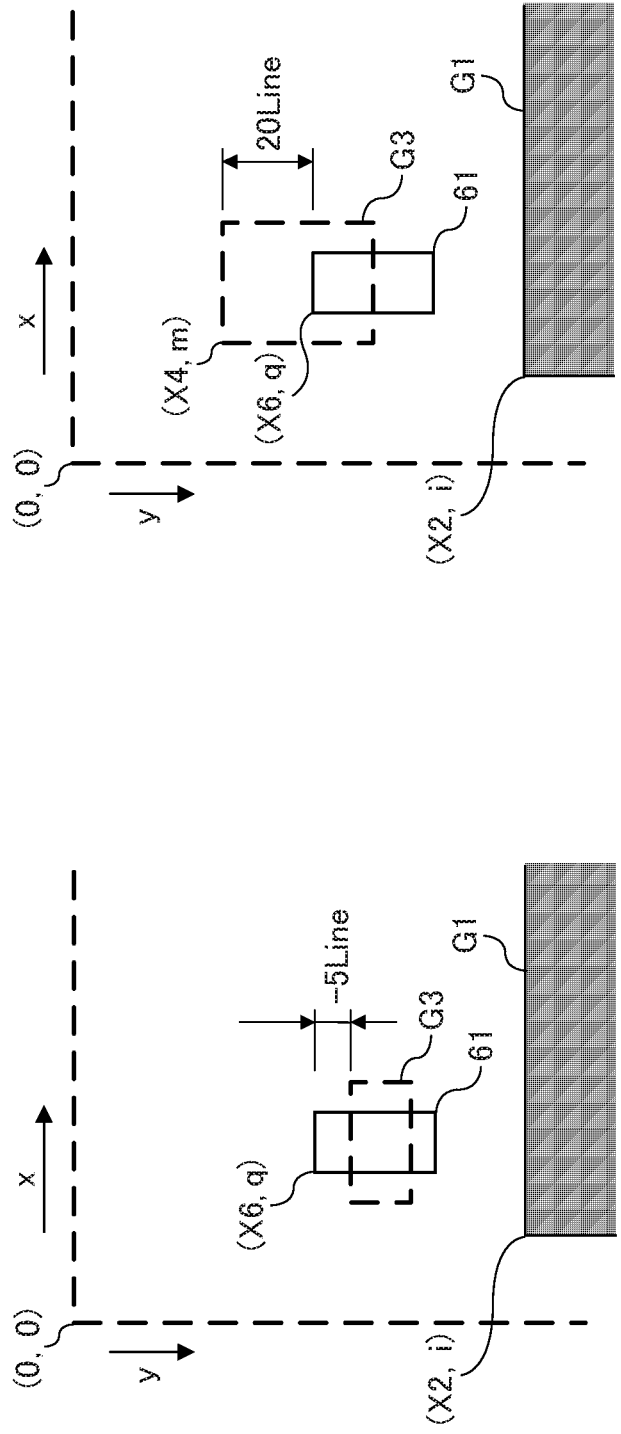

(N+3)-TH FRAME (VIBRATING)

(N+4)-TH FRAME (VIBRATION STOPS→STABLE CONTROL)

OPTICAL SCANNER, DISPLAY SYSTEM, MOBILE OBJECT, OPTICAL SCANNING CONTROL METHOD, AND RECORDING MEDIUM STORING PROGRAM CODE

CROSS-REFERENCE TO RELATED APPLICATIONS

This patent application is based on and claims priority pursuant to 35 U.S.C. § 119(a) to Japanese Patent Application Nos. 2019-004028 and 2019-102671, filed on Jan. 15, 2019, and May 31, 2019, respectively, in the Japan Patent Office, the entire disclosures of which are hereby incorporated by reference herein.

BACKGROUND

Technical Field

Embodiments of the present disclosure relate to an optical scanner, a display system, a mobile object, an optical scanning control method, and a recording medium storing program code.

Background Art

In the related art, display devices are known that use an oscillating mirror to scan the light flux emitted from a light source in the first and second directions and form a two-dimensional image. In such display devices, image light to be received by a photodiode (PD) is formed, and for example, the angle at which an oscillating mirror oscillates and the timing at which the light source emits light are controlled according to the timing at which a photo-sensing device such as a photodiode receives such image light. As a result, the position at which an image is formed or the size of the image is adjusted. Due to such adjustment, the position at which an image is formed by the first half of the go and return scanning of light flux is matched with the position at which an image is formed by the second half of the go and return scanning of light flux.

For example, an image display apparatus is known in the art that removes the image light to be received by a photodiode at the timing when the photodiode receives the image light to be received by the photodiode in order to avoid an situation in which the light flux that forms image light to be received by the photodiode breaks into the light flux that forms an image to be presented to a user as stray light (see, for example, JP-2015-031782-A).

SUMMARY

Embodiments of the present disclosure described herein provide an optical scanner, a display system, a mobile object, an optical scanning control method, and a recording medium storing program code. The optical scanner includes a light source configured to emit light, a light deflector configured to deflect the light emitted from the light source to scan a scanning area two-dimensionally in a main scanning direction and a sub-scanning direction, and a photodetector configured to detect scanning light deflected by the light deflector to perform scanning on a detection field included in the scanning area. In the scanning area, a detection scanning area is formed by the scanning light so as to include an end of the detection field, and a size of the detection scanning area is changed. The display system includes the optical scanner, an imaging optical system configured to reflect projection light projected from a screen on which the scanning light is scanned by the light deflector, and a reflector configured to reflect reflection light reflected by the imaging optical system. The imaging optical system projects the projection light towards the reflector to form a virtual image. The mobile object includes the display system, and the reflector is a front windshield. The optical scanning control method includes forming a detection scanning area by scanning light so as to include an end of a detection field included in a scanning area that is two-dimensionally scanned, and changing a size of the detection scanning area. The recording medium stores a program for causing a computer to execute the optical scanning control method.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 5 is a diagram illustrating a specific configuration of a screen according to the first embodiment of the present disclosure.

FIG. 6A and FIG. 6B are diagrams illustrating a difference in operation due to the differences in sizes of the diameter of incident light flux and the lens diameter in a microlens array, according to an embodiment of the present disclosure.

FIG. 12 is a diagram illustrating a conversion table for generating a driving voltage used to drive the mirror of a light deflector in the sub-scanning direction, according to an embodiment of the present disclosure.

FIG. 22A, FIG. 22B, FIG. 22C, FIG. 22D, and FIG. 22E are second diagrams each illustrating the changes in size of a no-light receiving area included in a detection image area, according to an embodiment of the present disclosure.

Figure 1:
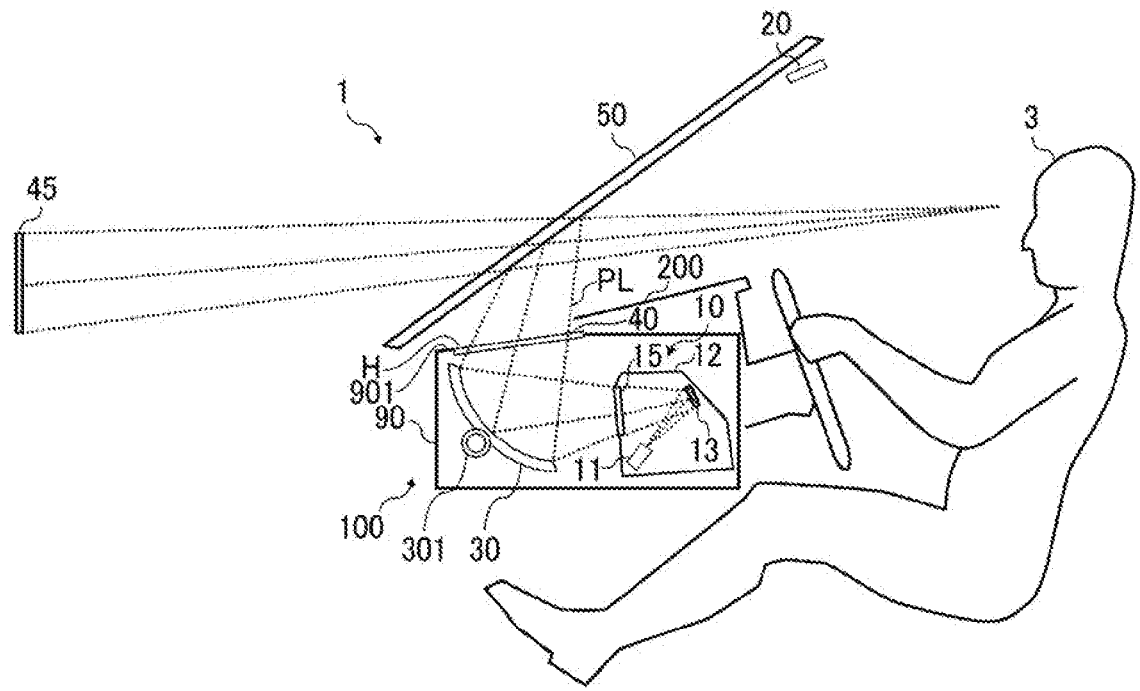
FIG. 1 is a diagram illustrating a system configuration of a display system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of the present disclosure are described below with reference to the accompanying drawings. In the description of the drawings, like reference signs denote like elements, and overlapping descriptions are omitted.

FIG. 1 is a diagram illustrating a system configuration of a display system 1 according to a first embodiment of the present disclosure.

In the display system 1, the viewer 3 can visually recognize a display image as the projection light PL that is projected from a display device 100 is projected onto a transmissive reflector. The display device 100 is an example of an optical scanner, and the display image is image superimposed on the viewing field of the viewer 3 as a virtual image 45. For example, the display system 1 is provided for a mobile object such as a vehicle, an aircraft, and a ship, or an immobile object such as a maneuvering simulation system, and a home-theater system. In the present embodiment, cases in which the display system 1 is provided for a vehicle as an example of the mobile object is described. However, no limitation is intended thereby, and the type of usage of the display system 1 is not limited to the present embodiment.

For example, the display system 1 is mounted in a vehicle, and makes navigation information visible to the viewer 3 (i.e., the driver) through a front windshield 50 of the vehicle. The navigation information includes, for example, the information about the speed of the vehicle, the course information, the distance to a destination, the name of the current place, the presence or position of an object ahead of the vehicle, a traffic sign indicating, for example, speed limit, and traffic congestion, and aids the driving of the vehicle. In such cases, the front windshield 50 serves as a transmissive reflector that transmits a portion of the incident light and reflects at least some of the remaining incident light. The distance between the location of the eyepoint of the viewer 3 and the front windshield 50 is about several tens of centimeters (cm) to one meter (m).

The display system 1 includes the display device 100, an extraneous light sensor 20, and a front windshield 50. For example, the display device 100 is a heads-up display (HUD) provided for a vehicle as an example of the mobile object. The display device 100 may be arranged at any desired position in conformity with the interior design of the vehicle. For example, the display device 100 according to the present embodiment may be disposed under a dashboard 200 of the vehicle or built into the dashboard of the vehicle.

Moreover, the display device 100 includes an image forming unit 10, a free-form surface mirror 30, and a housing 90. The free-form surface mirror 30 is an example of an imaging optical system. The image forming unit 10 includes a light-source device 11, a unit housing 12, a light deflector 13, and a screen 15. The light-source device 11 serves as a light source. The extraneous light sensor 20 is a sensing device that is disposed to detect, for example, the illuminance as the intensity of extraneous light of the display system 1. As illustrated in FIG. 1, for example, the extraneous light sensor 20 is arranged near the front windshield 50.

The light-source device 11, which is an example of a light source, is a device that emits the light to an area outside the device. For example, the light-source device 11 may emit laser beams in which three-color laser beams of red, green, and blue (RGB) are combined. The laser beams that are emitted from the light-source device 11 are guided to the reflection plane of the light deflector 13. For example, the light-source device 11 has a semiconductor light-emitting element such as a laser diode (LD) that serves as a light-source element. However, no limitation is intended thereby, and the light-source element may be a semiconductor light-emitting element such as a light-emitting diode (LED).

The light deflector 13 uses, for example, a micro-electro-mechanical systems (MEMS) to change the directions of travel of the laser beams. For example, the light deflector 13 is configured by a scanner such as a mirror system composed of one minute MEMS mirror that pivots around two axes orthogonal to each other or two MEMS mirrors that pivot or rotates around one axis. The laser beams that are emitted from the light deflector 13 scans the screen 15. The light that is scanned by the light deflector 13 may be referred to as scanning light in the following description. The light deflector 13 is not limited to a MEMS mirror, but may be configured by a polygon mirror or the like.

A two-dimensional intermediate image is formed on the screen 15, which serves as an image forming unit, as the surface of the screen 15 is scanned by the laser beams deflected by the by the light deflector 13. Note also that the screen 15 serves as a divergent part through which the scanned laser beams diverge at a predetermined divergence angle. For example, the screen 15 may consist of an exit pupil expander (EPE), and may be configured by a transmissive optical element such as a microlens array (MLA) or diffuser panel that diffuses light. Alternatively, the screen 15 may be configured by a reflective optical element such as a micromirror array that diffuses light. Alternatively, in some embodiments, the screen 15 may be a flat plate or curved plate that does not diffuse light.

In the display device 100, the optical path among a plurality of components may be changed depending on the layout inside the device, or the optical path among those components may be changed in order to downsize the device. For example, a reflection mirror may be disposed on the optical path between the light deflector 13 and the screen 15, and the screen 15 may be scanned by the scanning light that is emitted from the light deflector 13 and then is reflected by the reflection mirror. In other words, a configuration may be adopted in which the scanning light that is emitted from the light deflector 13 firstly scans the reflection plane of the reflection mirror and the scanning light that is reflected by the reflection mirror scans the surface of the screen 15.

Return to FIG. 1 for further description. The light-source device 11, the light deflector 13, and the screen 15 are integrally stored in the unit housing 12, and serve as a part of the image forming unit 10. The screen 15 is not covered by the unit housing 12 in its entirety such that the diverging light diverging through the screen 15 can be emitted outside the image forming unit 10, but is partially held by the unit housing 12. The unit housing 12 may be a single unit of three-dimensional object, or may be configured by a combination of a plurality of members. As an example configuration or structure in which a combination of a plurality of members are combined, the unit housing 12 may be configured by a combination of a plurality of members including the light-source device 11, the light deflector 13, a three-dimensional object that covers the optical path in its entirety, and a holder or the like that holds the screen 15.

The virtual image 45 is a magnified view of the intermediate image that is formed on the screen 15, and such a virtual image is achieved as the laser beams (light flux) that are the light diverging through the screen 15 are projected onto the free-form surface mirror 30 and the front windshield 50. The free-form surface mirror 30 is designed and arranged so as to cancel, for example, the inclination of the image, the distortion of the image, and the displacements of the image, which are caused by the bent shape of the front windshield 50. The free-form surface mirror 30 may be arranged in a pivotable manner around a rotation axis 301. For example, the rotation axis 301 passes through the center of gravity of the free-form surface mirror 30, and the free-form surface mirror 30 is rotated on a straight line parallel to the direction orthogonal to the sheet of FIG. 1 to change the position at which the virtual image 45 is displayed in the up-and-down directions on the sheet of FIG. 1. Due to such a configuration, the free-form surface mirror 30 can adjust the reflection direction of the laser beams (light flux) emitted from the screen 15 to change the position at which the virtual image 45 is displayed according to the positions of the eyes of the viewer (driver) 3.

The free-form surface mirror 30, which is an example of an imaging optical system, reflects the diverging light to project the projection light PL in order to form a virtual image with the light diverging through the screen 15. Due to this configuration, the free-form surface mirror 30 is designed using, for example, a commercially available optical design simulation software, such that the free-form surface mirror 30 has a certain level of light-gathering power to achieve a desired image-forming position of the virtual image 45. In the display device 100, the light-gathering power of the free-form surface mirror 30 is designed such that the virtual image 45 is displayed at a position away from the location of the eyepoint of the viewer 3 in the depth direction by, for example, at least 1 m and equal to or shorter than 30 m (preferably, equal to or shorter than 10 m).

The image forming optical system is satisfactory as long as it includes at least one light-concentrating element that has a light-concentrating function. Such a light-concentrating element that has a light-concentrating function is not limited to a free-form surface mirror like the free-form surface mirror 30, and may be, for example, a concave mirror, a curved-surface mirror, and a Fresnel reflector element. For example, such a light-concentrating element is formed by performing sputtering or vapor deposition on a thin metal film such as of aluminum (Al) and silver (Ag)

with high reflectivity. Due to such a configuration, the utilization efficiency of the light incident on a light-concentrating element as the projection light PL can be maximized, and a virtual image with high brightness can be obtained.

The projection light PL that is reflected by the free-form surface mirror 30 is projected outside the display device 100 from a slit formed on the housing 90, and is incident on the front windshield 50. As illustrated in FIG. 1, a hole H is formed on the housing 90 by a hole surrounding area 901. The hole surrounding area 901 is a part of the housing 90 around the hole H. The position and size of the hole H is determined depending on the size of the hole surrounding area 901 and the position at which the hole surrounding area 901 is arranged. In order to prevent a foreign substance from entering the housing 90 through the hole H, a dustproof window 40 is arranged so as to close the hole H. In particular, it is desired that the dustproof window 40 be made of a material through which the projection light PL can pass through.

The front windshield 50 is an example of a reflector, and serves as a transmissive reflector that transmits some of the laser beams (bundle of laser beams) and reflects at least some of the remaining laser beams (partial reflection). The front windshield 50 may serve as a semitransparent mirror through which the viewer 3 visually recognizes the virtual image 45 and the scenery ahead of the mobile object (vehicle). The virtual image 45 is an image that is visually recognized by the viewer 3, including vehicle-related information (e.g., speed and travel distance), navigation information (e.g., route guidance and traffic information), and warning information (e.g., collision warning). For example, the transmissive reflector may be another front windshield arranged in addition to the front windshield 50.

The virtual image 45 may be displayed so as to be superimposed on the scenery ahead of the front windshield 50. The front windshield 50 is not flat but is curved. For this reason, the position at which the virtual image 45 is formed is determined by the curved surface of the free-form surface mirror 30 and the front windshield 50. In some embodiments, the front windshield 50 may be a semitransparent mirror (combiner) that serves as a separate transmissive having a reflector partial reflection function.

The plane of the free-form surface mirror 30 is designed and shaped so as to reduce the optical strain that occurs on the front windshield 50 as. The light beams that are incident on the free-form surface mirror 30 are reflected by the free-form surface mirror 30 according to the shape of the plane of the free-form surface mirror 30. The reflected bundles of laser beams (light flux) are then incident on the front windshield 50, and reach at least one eyepoint within an eye-lip area including at least the eye-lip center (i.e., the reference eyepoint). The bundles of laser beams that are incident on the front windshield 50 are reflected according to the shape of the surface of the front windshield 50.

Due to such a configuration as above, the laser beams (light flux) that are emitted from the screen 15 are projected towards the free-form surface mirror 30. The projection light that is concentrated by the free-form surface mirror 30 passes through the hole H of the housing 90 and is projected towards the front windshield 50, and is reflected by the front windshield 50. Accordingly, the viewer 3 can visually recognize the virtual image 45. i.e., the magnified image of the intermediate image formed on the screen 15, due to the light reflected by the front windshield 50.

A method of projecting an image using the display device 100 may be implemented by, for example, a panel system or a laser scanning system. In the panel system, an intermediate image is formed by an imaging device such as a liquid crystal panel, a digital micromirror device (DMD) panel (digital mirror device panel), or a vacuum fluorescent display (VFD). In the laser scanning system, an intermediate image is formed by scanning the laser beams emitted from the light-source device 11, using an optical scanner.

The display device 100 according to the first embodiment of the present disclosure adopts the laser scanning system. In particular, in the laser scanning system, since emitting/non-emitting can be assigned to each pixel, in general, a high-contrast image can be formed. In some alternative embodiments, the panel system may be adopted as the projection system in the display device 100.

Figure 2:
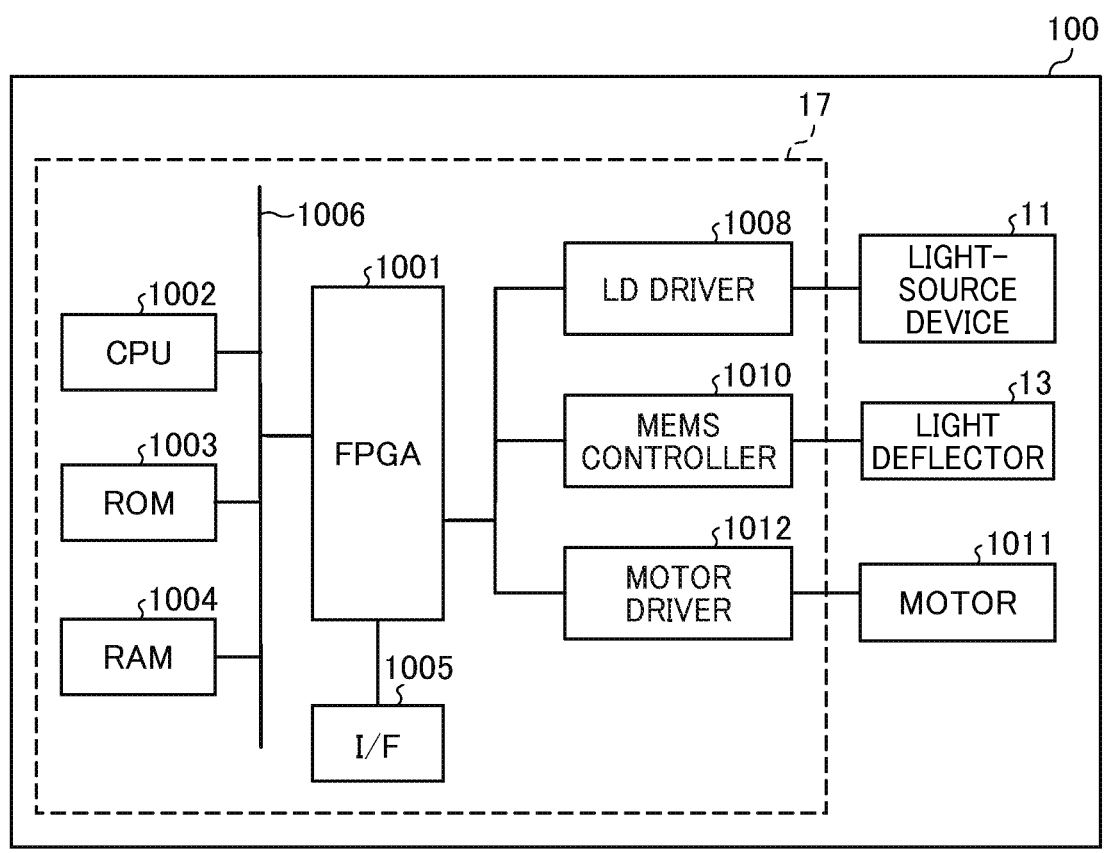
FIG. 2 is a diagram illustrating a hardware configuration of a display device according to the first embodiment of the present disclosure.

FIG. 2 is a diagram illustrating a hardware configuration of a display device according to the first embodiment of the present disclosure.

The hardware configuration illustrated in FIG. 2 may be adopted in common among the embodiments of the present disclosure. Alternatively, some components or elements may be added to or deleted from the hardware configuration of FIG. 2.

The display device 100 includes a controller 17 that controls the operation of the display device 100. For example, the controller 17 is a circuit board or integrated circuit (IC) chip mounted inside the display device 100. The controller 17 includes a field-programmable gate array (FPGA) 1001, a central processing unit (CPU) 1002, a read only memory (ROM) 1003, a random access memory (RAM) 1004, an interface (I/F) 1005, a data bus line 1006, a laser diode (LD) driver 1008, a micro-electromechanical systems (MEMS) controller 1010, and a motor driver 1012. The controller 17 is an example of a controller.

The FPGA 1001 is an integrated circuit that is configurable by the designer of the display device 100. The LD driver 1008, the MEMS controller 1010, and the motor driver 1012 generate a driving signal according to the control signal output from the FPGA 1001. The CPU 1002 is an integrated circuit that controls the entirety of the display device 100. The ROM 1003 is a storage device that stores a computer executable program for controlling the CPU 1002. The RAM 1004 is a storage device that serves as a work area of the CPU 1002.

The interface 1005 communicates with an external device. For example, the interface 1005 is coupled to the controller area network (CAN) of a vehicle. Moreover, the interface 1005 is coupled to, for example, the extraneous light sensor 20. The extraneous light sensor 20 sends the sensing data (i.e., the intensity of the extraneous light) to the controller 17 through the interface 1005. Note also that the sensor that is coupled to the interface 1005 is not limited to the extraneous light sensor 20, and other various kinds of sensors for acquiring the internal and external information of the vehicle may be coupled to the interface 1005.

The LD driver 1008 is a circuit that generates a driving signal for driving the light-source device 11. For example, the LD driver 1008 generates a driving signal for a semiconductor light-emitting element LD that configures a part of the light-source device 11. The MEMS controller 1010 is a circuit that generates a driving signal for driving the light deflector 13. For example, the MEMS controller 1010 generates a driving signal for driving the MEMS that is a device for moving a scanning mirror that configures a part of the light deflector 13. The motor driver 1012 is a circuit that generates a driving signal for driving various kinds of motors. For example, the motor driver 1012 generates a driving signal for driving the motor 1011 that rotates the rotation axis 301 of the free-form surface mirror 30.

Figure 3:
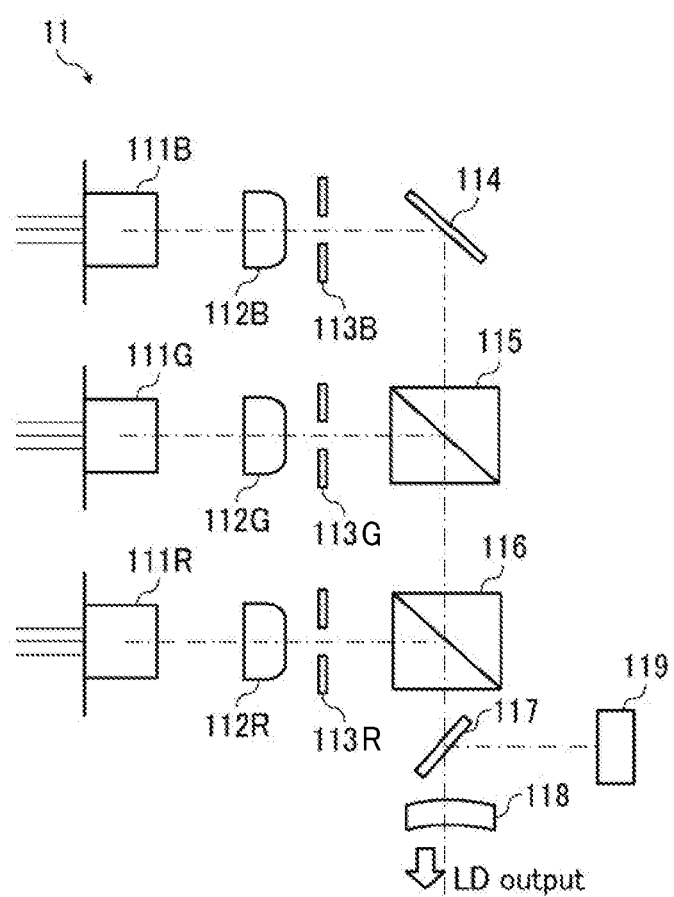
FIG. 3 is a diagram illustrating a specific configuration of a light source according to the first embodiment of the present disclosure.

FIG. 3 is a diagram illustrating a specific configuration of the light-source device 11 according to the first embodiment of the present disclosure.

The light-source device 11 includes light-source elements 111R, 111G, and 111B (these light-source elements may be referred to simply as a light-source element 111 in the following description when it is not necessary to distinguish each of the light-source elements), coupling lenses 112R, 112G, and 112B, apertures 113R, 113G, and 113B, combiners 114, 115, and 116, an optical branching element 117, a lens 118, and a photodetector 119.

For example, each of the light-source elements 111 R, 111 G, and 111 B of three colors (R. G. B) of three colors (red, green, and blue (RGB)) is a laser diode (LD) having a single or a plurality of light-emitting points. Each of the light-source elements 111R, 111G, and 111B emits laser beams whose light intensity depends on the amount of changes in the driving current that is given to each of the light-source elements. The light-source elements 111R, 111G, and 111B emit bundles of laser beams (light flux) having different wavelengths λR, λG, and λB, respectively. For example, λR=640 nanometers (nm), λG=530 nm, and λB=445 nm.

The emitted bundles of laser beams (light flux) are coupled by the coupling lenses 112R 1120, and 112B, respectively. The coupled bundles of laser beams (light flux) are shaped by the apertures 113, 113G, and 113B, respectively. The shape of the apertures 113R. 113G, and 113B may be various kinds of shape such as a circle, an ellipse, a rectangle, and a square depending on, for example, certain predetermined conditions such as the divergence angle of the bundles of laser beams (light flux).

The laser beams (light flux) that are shaped by the apertures 113R, 113G, and 113B are combined by the three combiners 114, 115, and 116, respectively. The combiners 114, 115, and 116 are plate-like or prismatic dichroic mirrors, and reflect or transmit the laser beams (light flux) therethrough according to the wavelength of the laser beams to combine the laser beams into one bundle of laser beams (light flux) that travels along one optical path. Then, the combined bundle of laser beams (light flux) is incident on the optical branching element 117.

Some of the light that is incident on the optical branching element 117 passes through the optical branching element 117, and different some of the light that is incident on the optical branching element 117 is reflected by the optical branching element 117. In other words, the combined laser beams (light flux) are branched into transmitted light and reflected light by the optical branching element 117.

The transmitted light passes through the lens 118, and the light deflector 13 is irradiated with the transmitted light. As a result, the transmitted light is used to draw an image or display a virtual image on the screen 15. In other words, the transmitted light is used as light for projecting an image.

On the other hand, the photodetector 119 is irradiated with the reflected light. The photodetector 119 outputs an electrical signal according to the light intensity of the received laser beams. For example, the output electrical signal is output to the FPGA 1001, and may be used to control the display system 1. As described above, according to the present embodiment, the reflected light is used as monitoring light that adjusts the intensity of the laser beams or monitoring light that adjusts the color or brightness of the resultant virtual image.

Figure 4:
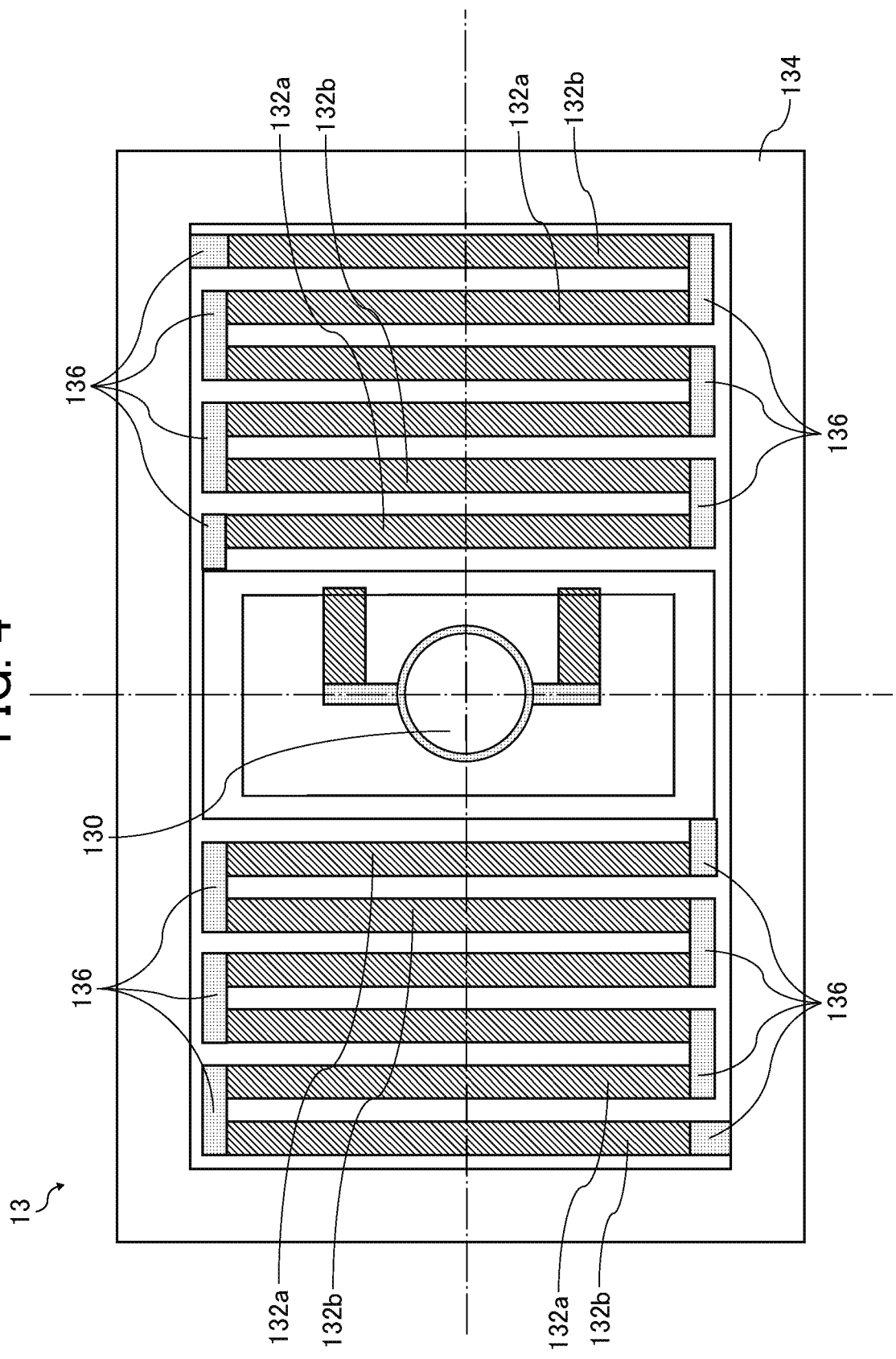
FIG. 4 is a diagram illustrating a specific configuration of a light deflector according to the first embodiment of the present disclosure.

FIG. 4 is a diagram illustrating a specific configuration of the light deflector 13 according to the first embodiment of the present disclosure.

The light deflector 13 is a MEMS mirror produced by semiconductor processing, and includes a mirror 130, a serpentine beam 132, a frame 134, and a piezoelectric member 136. The light deflector 13 is an example of a light deflector.

The mirror 130 has a reflection plane that reflects the laser beams emitted from the light-source device 11 towards the screen 15 side. In the light deflector 13, a pair of serpentine beams 132 are formed across the mirror 130. Each of the pair of serpentine beams 132 has a plurality of turning portions. Each of these turning portions is configured by a first beam 132a and a second beam 132b that are arranged alternately. Each of the pair of serpentine beams 132 is supported by the frame 134. The piezoelectric member 136 is disposed such that the first beam 132a and the second beam 132b, which are adjacent to each other, are coupled to each other. The piezoelectric member 136 applies different levels of voltage to the first beam 132a and the second beam 132b to bend each of the first beam 132a and the second beam 132b differently.

As a result, the first beam 132a and the second beam 132b, which are adjacent to each other, bend in different directions. As the bending force is accumulated, the mirror 130 rotates in the vertical direction around the horizontal axis. Due to such a configuration as above, the light deflector 13 can perform optical scanning in the vertical direction at a low voltage. An optical scanning in the horizontal direction around the axis in the vertical direction is implemented by the resonance produced by a torsion bar or the like coupled to the mirror 130.

FIG. 5 is a diagram illustrating a specific configuration of the screen 15 according to the first embodiment of the present disclosure.

The laser beams that are emitted from the light-source elements 111R, 111G, and 111B that are laser diodes (LDs) and together configure a part of the light-source device 11 form an image on the screen 15. The screen 15 serves as a divergent part that diverges the laser beams at a predetermined divergence angle. The screen 15 as illustrated in FIG. 5 has a microlens-array structure in which a plurality of hexagonal-shaped microlenses 150 are arranged with no gap therebetween. For example, the width of each of the microlenses 150 (the distance between two sides that face each other) is optimized to a ranged from 50 micrometers (μm) to 300 μm. In the present embodiment, the width of each of the microlenses 150 is approximately 200 μm. As the microlenses 150 of the screen 15 have a hexagonal shape, the multiple microlenses 150 can be arrayed with high density.

Note that the shape of each of the microlenses 150 is not limited to a hexagonal shape. For example, in some embodiments, the microlenses 150 have a rectangular shape or a triangular shape. In the present embodiment, structure in which the multiple microlenses 150 are arrayed in a regularized manner is described. However, no limitation is intended thereby, and the arrangement of the microlenses 150 is not limited to this structure. For example, the centers of the multiple microlenses 150 may be decentered from each other, and the microlenses 150 may be arranged in an irregular manner. When such a decentered arrangement is adopted, those multiple microlenses 150 have different shapes from each other.

Alternatively, the height of the vertex in the optical-axis direction may be changed. When the decentering in the direction in which microlenses are arrayed or the shifting in the optical-axis direction is determined on a random basis, for example, the speckles that are caused by the interference of the laser beams that have passed through the boundary between each pair of neighboring microlenses and the moire that is caused by the cyclic array can be reduced.

The laser beams that have reached the screen 15 scan the inside of the microlenses 150, and multiple dots are marked as the laser beams are switched on and off during the scanning. For example, the levels of gradation can be expressed by a combination of on-off control of light. Alternatively, the levels of gradation may be expressed by adjusting the radiation intensity of the laser beams.

FIG. 6A and FIG. 6B are diagrams illustrating a difference in operation due to the differences in sizes of the diameter of incident light flux and the lens diameter in a microlens array, according to the present embodiment. As illustrated in FIG. 6A, the screen 15 is configured by an optical plate 151 in which the multiple microlenses 150 are neatly arranged. When an incident light 152 is scanned on the optical plate 151, the incident light 152 diverges as passing through the microlenses 150, and the incident light 152 becomes a diverging light 153. Due to the structure of the microlenses 150, the screen 15 can disperse the incident light 152 at a desired divergence angle 154. The intervals 155 at which the microlenses 150 are arranged is designed to be wider than the diameter 156a of the incident light 152. Accordingly, the screen 15 does not cause interference among the lenses, and does not cause speckles (speckle noise).

FIG. 6B is a diagram illustrating the optical paths of diverging lights when the diameter 156b of the incident light 152 is twice wider than the intervals 155 at which the microlenses 150 are arranged. The incident light 152 is incident on two microlenses 150a and 150b, and these two microlenses 150a and 150b produce two diverging lights 157 and 158, respectively. In such cases, lights may interfere with each other as two diverging lights exist in an area 159. Such an interference between two diverging lights (coherent light) is visually recognized as a speckle by an observer.

In view of the above circumstances, the intervals 155 at which the microlenses 150 are arranged is designed to be wider than the diameter 156 of the incident light 152 in order to reduce the speckles. A configuration with convex lenses is described as above with reference to FIG. 6A and FIG. 6B. However, no limitation is indicated thereby, and advantageous effects can be expected in a similar manner in a configuration with concave lenses.

As described above with reference to FIG. 5, FIG. 6A, and FIG. 6B, the screen 15 that is an example of an image forming unit serves as a divergent part through which the scanned laser beams diverge at a predetermined divergence angle. Due to this functionality, the driver (viewer) 3 can recognize an image in the range of the eye box.

In other words, even when the driver (viewer) 3 who is seated on the driver's seat changes the positions of his/her eyes to some extent, his/her visually-recognizable range can be secured.

As described above, it is desired that the shape of each one of the microlenses 150 have a certain level of precision such that the light appropriately diverges through the screen 15 provided with the microlenses 150. Further, preferably, the screen 15 can be mass-produced. For this reason, for example, the screen 15 is molded by resin material. A concrete example of resin that satisfies the reflection property or optical property required for the microlenses 150 may include methacrylic resin, polyolefin resin, polycarbonate, and cyclic polyolefin resin. However, no limitation is intended thereby.

Figure 7:
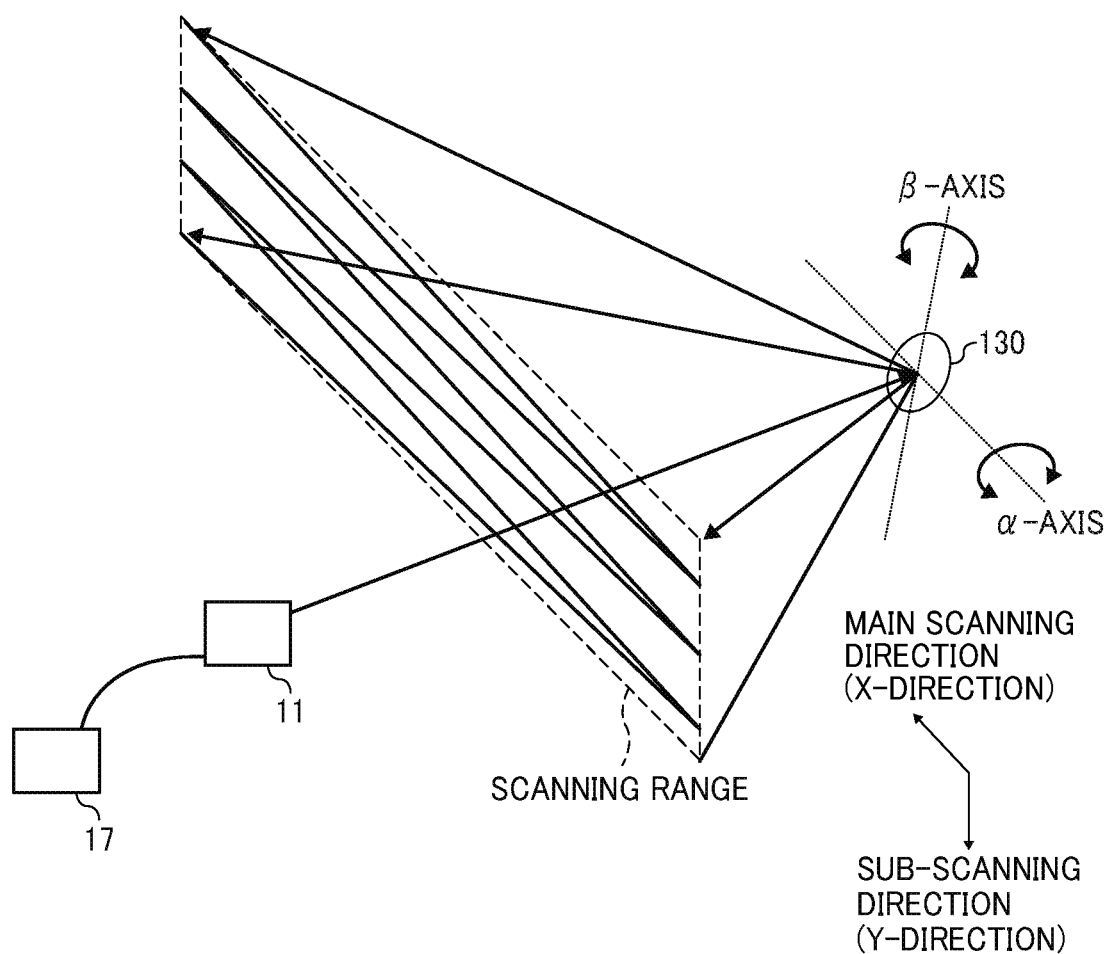
FIG. 7 is a diagram illustrating the relation between a mirror of a light deflector and a scanning area, according to an embodiment of the present disclosure.

FIG. 7 is a diagram illustrating the relation between a mirror of a light deflector and a scanning area, according to the present embodiment. The FPGA 1001 of the controller 17 controls the light-emission intensity, the timing of light emission, and the light waveform of the multiple light-source elements in the light-source device 11. The LD driver 1008 drives the multiple light-source elements of the light-source device 11 to emit laser beams. As illustrated in FIG. 7, the laser beams that are emitted from the multiple light-source elements and whose optical paths are combined are two-dimensionally deflected about the α axis and the β axis by the mirror 130 of the light deflector 13, and a plane including the screen 15 is irradiated with the laser beams deflected by the mirror 130, which serve as scanning beams. In other words, the screen 15 is two-dimensionally scanned by main scanning and sub-scanning by the light deflector 13.

In the present embodiment, the entire area to be scanned by the light deflector 13 may be referred to as a scanning area. The scanning light scans (two-way scans) a certain face, for example, a plane including the surface of the screen 15, in an oscillating manner in the main scanning direction (X-direction). Moreover, the scanning light one-way scans a predetermined amount of the certain face in the sub-scanning direction (Y-direction). As a result, a scanning area is formed on the plane including the surface of the screen 15. In other words, the light deflector 13 performs raster scanning on a plane including the screen 15. In this configuration, the display device 100 controls the light emission of the multiple light-source elements according to the scanning position (the position of the scanning beam). Accordingly, an image can be drawn on a pixel-by-pixel basis and a virtual image can be displayed. The scanning in the main scanning direction is performed at a high frequency of about 20,000 to 40.000 hertz (Hz), and the scanning in the sub-scanning direction is performed in a cycle at a frequency of about a few tens of Hz, which is lower than the frequency in the main scanning direction.

As described above, a two-dimensional scanning area is formed on the plane including the surface of the screen 15 every time raster scanning is performed one time. In other words, a two-dimensional scanning area is formed on the plane including the surface of the screen 15 for every sub-scanning cycle that is a predetermined cycle. The scanning area that is formed every time raster scanning is performed one time may be referred to as a scanning frame. As described above, the sub-scanning frequency is about a few tens of hertz (Hz). Accordingly, the length of time it takes for a scanning area to be formed every sub-scanning cycle, i.e., the length of time to scan one scanning frame (one cycle of two-dimensional scanning), is a few tens of millisecond (msec). For example, assuming that the main-scanning frequency is 20,000 Hz, the length of time it takes to scan one cycle in the main scanning direction (one cycle of main scanning) is 50 microseconds (μsec). For example, assuming that the sub-scanning frequency is 50 Hz, the length of time to scan one scanning frame in one cycle of two-dimensional scanning is 20 msec with reference to the sub-scanning frequency.

Figure 8:
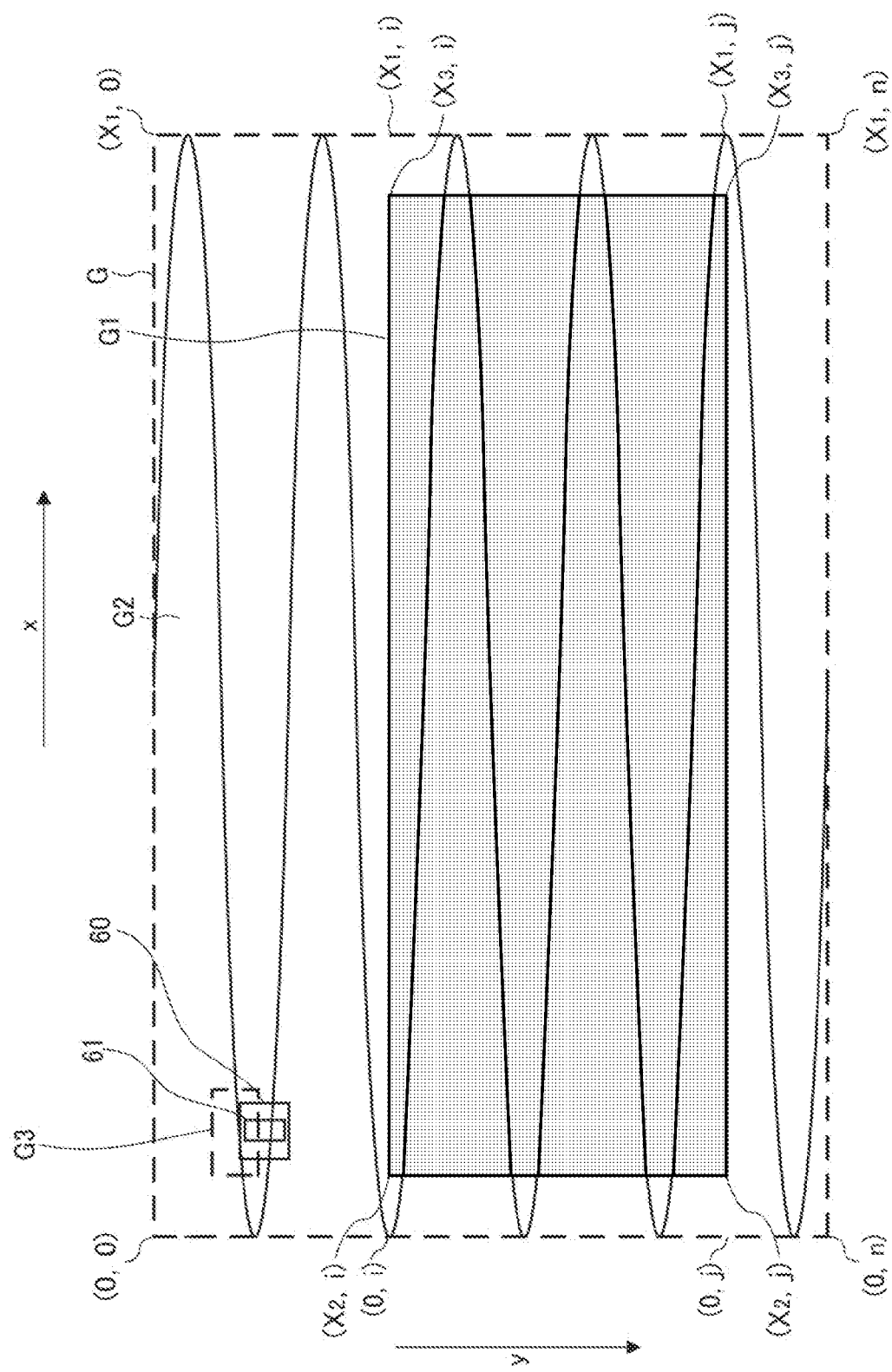
FIG. 8 is a diagram illustrating a scanning area according to an embodiment of the present disclosure.

FIG. 8 is a diagram illustrating a scanning area G according to the present embodiment.

As illustrated in FIG. 8, the scanning area G includes a non-image area G2 and an image displaying area G1 (i.e., an area on which an image is formed as the light-source device 11 is turned on according to the image data and the area is irradiated with the modulated light) on which an intermediate image is drawn. The non-image area G2 is a frame-shaped area that surrounds the image displaying area G1. Moreover, the non-image area G2 includes a detection image area G3 that is an example of a detection scanning area.

The display image area G1 is a portion of the scanning area G that corresponds to an image to be presented to a user, and the scanning light that scans the image displaying area G1 the light that is emitted to the outside of the image forming unit 10. When the screen 15 is a divergent part as described above with reference to FIG. 5, the scanning light that scans the image displaying area G1 diverges as passing through the microlenses 150.

As described above, the light flux of laser beams that are emitted from the light-source device 11 is deflected as reflected by the mirror 130, and is scanned two-dimensionally in the X-direction and the Y-direction. As the light flux of laser beams that are emitted from the light-source device 11 is deflected as reflected by the mirror 130 in the X-direction and the Y-direction, an image to be presented to a user in the first half of the go and return scanning is formed within range of the image displaying area G1. As the light flux of laser beams is deflected as reflected in the Y-direction and the –X-direction opposite to the +X-direction, an image to be presented to a user in the second half of the go and return scanning is formed within range of the image displaying area G1. Then, the scanning area G, which is scanned by the mirror 130, is formed as the area that includes the image displaying area G1 and the non-image area G2.

As illustrated in FIG. 8, the scanning area G is the area indicated within coordinates (0, 0), ($X_1$, 0), ($X_1$, n), and (0, n), and the image displaying area G1 is the area indicated within coordinates ($X_2$, i), ($X_3$, i). ($X_3$, j), and ($X_2$, j).

The detection image area G3 in the scanning area G is the peripheral area of the image displaying area G1 (a part of the non-image area G2). The light-source device 11 is turned on, and a detection image is formed on the detection image area G3 by the scanning light that is scanned by the light deflector 13. For example, the photosensor 60 is arranged within range of the non-image area G2 to detect the scanning light that form the detection image. More specifically, the photosensor 60 is arranged at a position on a scanning-starting side in the main scanning direction (X-direction) and on a scanning-starting side in the sub-scanning direction (Y-direction).

The photosensor 60 includes a light receiver 61 (an example of a photodetector) such as a photodiode (PD). The light receiver 61 is at least partially scanned by the scanning light that form a detection image. In other words, the light receiver 61 is arranged such that at least a portion of the light receiver 61 is included in the detection image area G3. The detection image area G3 is formed so as to include at least some of the light receiver 61. In other words, the detection image area G3 is formed in an overlapping manner with the light receiver 61. A field in which the light receiver 61 detects the scanning light is referred to as a detection field, and such a detection field is included in the area in which the scanning area G overlaps with the light receiver 61. In the present embodiment, the detection field matches the area in which the scanning area G overlaps with the light receiver 61. However, no limitation is indicated thereby, and the detection field may be smaller than the area in which the scanning area G overlaps with the light receiver 61. Alternatively, a mirror may be arranged in the detection field that is included in the scanning area G, and the light receiver 61 may be arranged at a position to receive the light reflected by the mirror.

Once the light receiver 61, which is a photodiode, receives the scanning light that forms a detection image, the photosensor 60 outputs a detection signal. The detection signal that is output from the photosensor 60 that has detected the scanning light is output to the FPGA 1001. The FPGA 1001 detects the operation of the light deflector 13 based on the timing at which the detection signal is received. Accordingly, the start timing of scanning or the end timing of scanning can be determined. For example, the photosensor 60 may be arranged on or around the screen 15 or on a holder that holds the screen 15, on an as-needed basis. The size of the detection image may be adjusted in view of the atmospheric temperature and the aged deterioration.

The scanning line in the scanning area G is further described with reference to FIG. 8. In the track of the scanning in the scanning region G, a plurality of main scanning lines, which are linear track of scanning in the main scanning direction, are drawn in the sub-scanning direction, and form a zigzag line. In other words, the track of scanning line where a plurality of main scanning lines are drawn in the sub-scanning direction, which are linear track of scanning in the main scanning direction, is formed in the scanning area G.

In the image displaying area G1, a display image to be presented to a user is formed by the track of scanning line where a plurality of main scanning lines, which are linear track of scanning in the main scanning direction, are drawn in the sub-scanning direction. For example, the display image is a still image (frame) that makes up the input moving images (video data). In the following description, the area within the image displaying area G1 in a scanning frame may be referred to as a scanning-frame image. In the detection image area G3, a detection image to be detected by the light receiver 61 is formed by the track of scanning line where a plurality of main scanning lines, which are linear track of scanning in the main scanning direction, are drawn in the sub-scanning direction.

As described above, in the scanning area G, a plurality of main scanning lines are drawn in rows at regular intervals in the sub-scanning direction. For this reason, the position in the sub-scanning direction may be expressed by the information that specifies a particular main scanning line. For example, the position in the sub-scanning direction may be expressed by the numerical listing of the scanning lines that indicates the position in the scanning area G. Moreover, the width in the sub-scanning direction can be expressed based on the number of main scanning lines.

All the cycles in which a scanning frame, a scanning-frame image, and a detection image are formed corresponds to the sub-scanning cycle. A scanning-frame image is sequentially formed based on the image data for every sub-scanning cycle, and the virtual image 45 is drawn. Due to such a configuration, the viewer 3 who observes the virtual image 45 that is sequentially displayed can visually recognize the virtual image 45 as moving images.

For the sake of explanatory convenience, the number of main-scanning lines in FIG. 8 is less than the actual number of main-scanning lines. In FIG. 8, the track of the scanning is a zigzag line where the ends of the main scanning lines are contiguous to each other. However, no limitation is intended thereby. In other words, the main scanning lines may be parallel to each other, and the ends of the main scanning lines may be not continuous. The main scanning lines may be formed by the two-way scanning as illustrated in FIG. 8, or may be formed by repeated one-way scanning.

Figure 9:
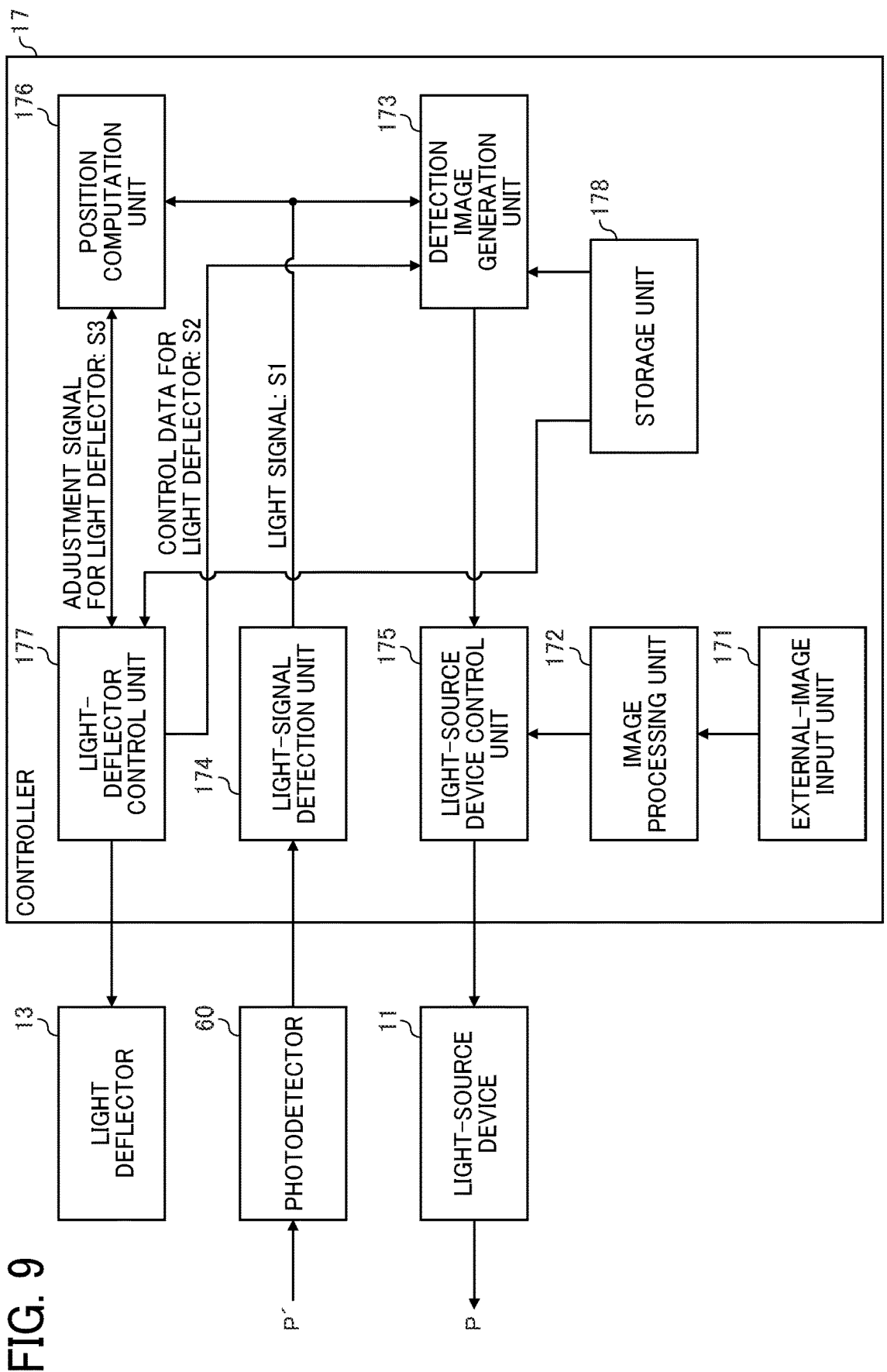
FIG. 9 is a diagram illustrating a functional configuration of a control system according to the first embodiment of the present disclosure.

FIG. 9 is a diagram illustrating a functional configuration of the display device 100 according to the first embodiment of the present disclosure.

The controller 17 of the display device 100 includes an external-image input unit 171, an image processing unit 172, a detection image generation unit 173, a light-signal detection unit 174, a light-source device control unit 175, a position computation unit 176, a light-deflector control unit 177, and a storage unit 178. For example, each functional configuration of the controller 17 is implemented by some of the elements illustrated in FIG. 2. In particular, the controller 17 may be implemented by the processing performed by the CPU 1002, the ROM 1003, the FPGA 1001, the LD driver 1008, the MEMS controller 1010, and the motor driver 1012, as well as a computer executable program stored in the ROM 1003.

The external-image input unit 171 outputs to the image processing unit 172 the image data for forming a display image that is an image to be presented to a user. When the display device 100 is provided for a vehicle as a HUD, an image to be presented to a user includes, for example, the vehicle-related information (e.g., speed and travel distance) and external information (for example, position information from the global positioning system (GPS), routing information from a navigation system, or traffic information) of the vehicle received from an external network. However, no limitation is intended thereby, and an image to be presented to a user may be, for example, an image based on an image regenerative signal read from the television (TV), the Internet, or a recording medium.

The image processing unit 172 generates driving data for driving the light-source device 11 based on the image data input from the external-image input unit 171, and outputs the generated driving data to the light-source device control unit 175. For example, when the image data contains moving images, the image processing unit 172 generates a scanning-frame image based on the multiple frames that make up the moving images that are input from the external-image input unit 171, i.e., the multiple images of one screen included in the moving images, and generates driving data in sequence so as to display the virtual image 45. For example, one frame of the moving images may be displayed using the scanning-frame images in two continuous cycles of two-dimensional scanning. Such driving data may indicate, for example, the timing at which laser beams are to be emitted and the light-emission intensity (power of light emission). However, no limitation is intended thereby.

The detection image generation unit 173 generates the image data of a detection image to be received by the light receiver 61 of the photosensor 60, and generates driving data for the light-source device 11 based on the generated image data. The driving data for the light-source device 11 includes, for example, the timing at which laser beams are to be emitted and light-emission intensity (power of light emission). The generated driving data is output to the light-source device control unit 175.

Once a detection signal is input from the photosensor 60 that has received light flux P', the light-signal detection unit 174 outputs light signal S1 to the detection image generation unit 173 and the position computation unit 176.

The light-source device control unit 175 outputs a control signal for controlling the light-source device 11 to be turned on and emit light, based on the driving data. The laser driving data of an image to be presented to a user sent from the image processing unit 172 and the laser driving data of a detection image sent from the detection image generation unit 173 are exclusively input control data. However, when these two kinds of laser driving data are input at the same time, the output priority may be determined in advance. The light-source device 11 outputs the light flux P according to the control made by the light-source device control unit 175.

The position computation unit 176 outputs to the light-deflector control unit 177 the light signal S1 and an adjustment signal S3 that is used for adjusting the width of oscillation of an oscillating mirror, based on the light signal S1 detected by the light-signal detection unit 174, to determine the position at which the scanning of the scanning area G starts and the scanning width of the scanning area G.

The light-deflector control unit 177 outputs a control signal for making the mirror 130 oscillate at regular intervals, based on, for example, a predetermined driving voltage or the adjustment signal S3 sent from the position computation unit 176.

When image data for generating a detection image is generated by the detection image generation unit 173, the size of the detection image in the sub-scanning direction is determined based on light-deflector control data S2 and the timing at which the light signal S1 is output from the light-signal detection unit 174. The light-deflector control data S2 may contain, for example, the data of the drive frequency of the mirror 130 and the position information indicating the position in the sub-scanning direction where scanning is being performed at that time due to the control made by the light-deflector control unit 177.

The detection image area G3 is described below with reference to FIG. 10. As described above, the detection image area G3 is formed so as to include at least some of the light receiver 61. For example, in FIG. 10, the detection image area G3 overlaps with the bottom half of the light receiver 61, which is a photodiode, in the sub-scanning direction. In other words, the detection image area G3 overlaps with the bottom half of the light receiver 61, which is a photodiode, in the downward direction in FIG. 10. The Y-direction corresponds to the sub-scanning direction, and the ends of the light receiver 61 in the sub-scanning direction are defined as follows. Regarding the upper end in FIG. 10, i.e., the end on the starting side in the sub-scanning direction, y=q. Regarding the lower end, i.e., the other end opposite the end on the starting side in the sub-scanning direction, y=q'. The detection image area G3 includes the end of the light receiver 61 and the detection field on the scanning-starting side (y=q) in the sub-scanning direction. On the other hand, the light receiver 61 and the detection field overlaps with the top half of the detection image area G3 in the sub-scanning direction, and does not overlap with the bottom half of the detection image area G3 in the sub-scanning direction. In other words, the light receiver 61 and the detection field overlaps with the top half of the detection image area G3 in the upward direction in FIG. 10, and does not overlap with the bottom half of the detection image area G3 in the downward direction in FIG. 10.

Figure 10:
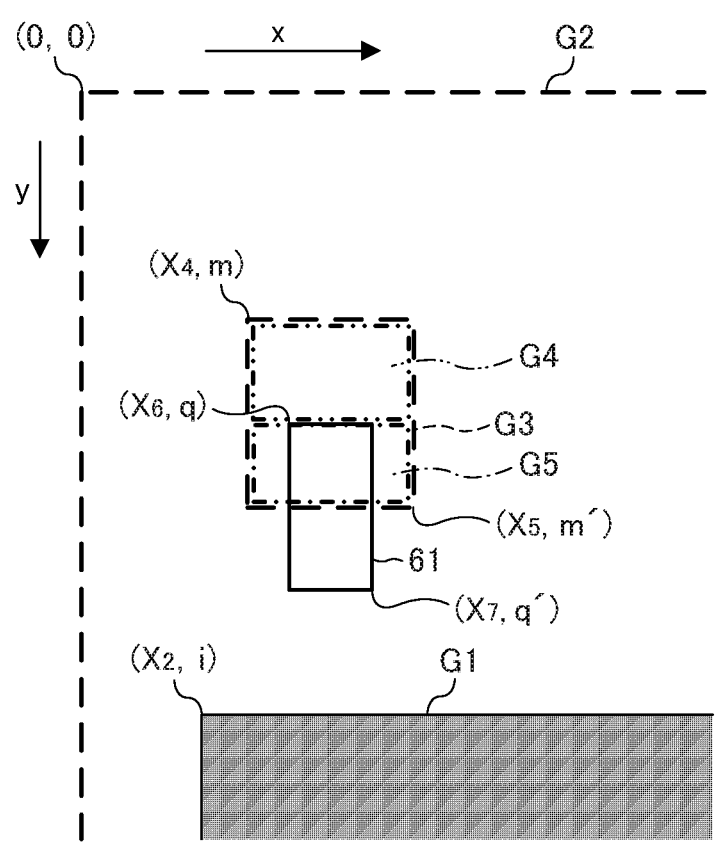
FIG. 10 is another diagram illustrating a scanning area according to an embodiment of the present disclosure.

G4 that is indicated by the dot-dot-dash line in FIG. 10 denotes a no-light receiving area in which the main scanning lines that form a detection image do not scan the light receiver 61 in the detection image area G3. In other words, the light receiver 61 does not receive any light in the no-light receiving area G4. By contrast, G5 that is indicated by the alternate long and short dashed lines in FIG. 10 denotes a light receiving area in which the main scanning lines that form a detection image scan the light receiver 61 in the detection image area G3. In other words, the light receiving area G5 is an area in the sub-scanning direction where the light receiver 61 receives light. The coordinate of each area in the sub-scanning direction is as follows. Regarding the detection image area G3, y=m to m'. Regarding the no-light receiving area G4, y=m to q. Regarding the light receiving area G5, y=q to m'. In the embodiments of the present disclosure, the size of the no-light receiving area G4 in the sub-scanning direction is changed. In the following description, control operations in which the size of the no-light receiving area G4 in the sub-scanning direction is reduced to a size within a predetermined size are described.

Figure 11:
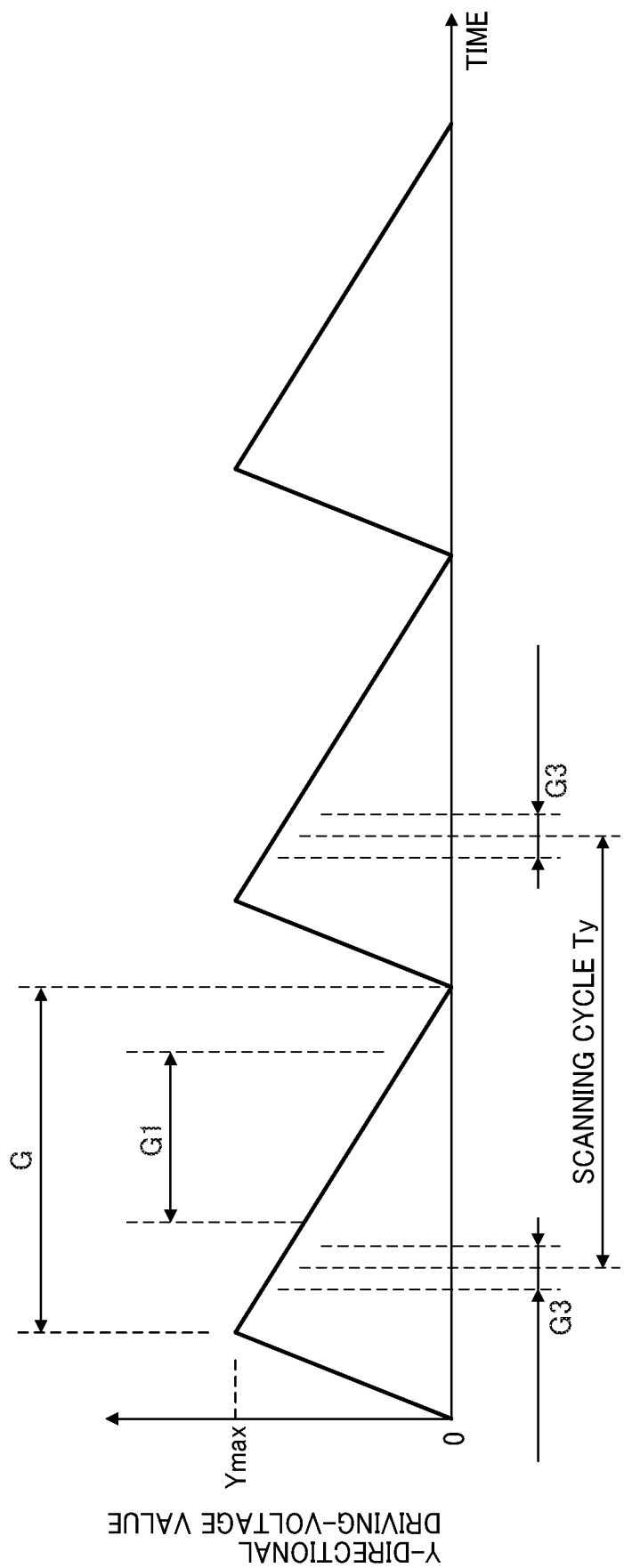
FIG. 11 is a graph of driving voltage used to drive the mirror of a light deflector in the sub-scanning direction, according to an embodiment of the present disclosure.

FIG. 11 is a graph of driving voltage used to drive the mirror of the light deflector 13 in the sub-scanning direction, according to the present embodiment.

The light-deflector control unit 177 makes the mirror 130 oscillate at regular intervals to scan the light. The waveform of driving voltage for making the mirror 130 oscillate is generated based on the conversion table depicted in FIG. 12. For example, the conversion table is stored in the storage unit 178 in advance before the mirror 130 is to be controlled.

The driving voltage Ymax in the Y-direction corresponds to the point in time at which the scanning position in the sub-scanning direction, i.e., the Y-direction in FIG. 8, is 0. In FIG. 11, a case in which the waveform of driving voltage is triangular is illustrated. However, no limitation is intended thereby, and the driving voltage may be shaped like, for example, a sinusoidal wave.

FIG. 12 is a diagram illustrating a conversion table for generating a driving voltage used to drive the mirror in the sub-scanning direction, according to the present embodiment.

For example, the table address (tbl_adr) takes the value from one of 0 to 1023. Each of the table addresses is associated in advance with the scanning position on the screen 15 in the Y-direction, i.e., the position in the sub-scanning direction. In other words, each one of the table addresses is associated with a Y-directional driving-voltage value in the conversion table. In the present embodiment, the Y-directional driving-voltage value is the voltage value (digitalized value) required for the mirror 130 to oscillate and deflect the light to the scanning position in the Y-direction, which corresponds to the associated table address. The above conversion table has a function to generate one pulse of scanning-frame synchronizing signal when the table address is 0. This conversion table may be the same as a conversion table used for displaying a display image, or may uniquely be designed to control the no-light receiving area G4.

Once the oscillation control of the mirror 130 starts, the light-deflector control unit 177 increments the table address as depicted in FIG. 12 in sequence from 0, and extracts the voltage value (digitalized value) used to make the mirror 130 oscillate and deflect the light to the scanning position in the Y-direction, which corresponds to each table address. Then, the light-deflector control unit 177 outputs the extracted voltage value to the light deflector 13. For example, the voltage value is output as a driving voltage through a digital-to-analog (D/A) converter. The table addresses make a round in a sub-scanning cycle Ty.

In the example as illustrated in FIG. 12, the scanning position in the Y-direction is maximized (Ymax) when the table address (tbl_adr) is 200. However, no limitation is intended thereby. In the example as illustrated in FIG. 12, the table address as depicted in FIG. 12 is set such that the scanning position in the Y-direction as illustrated in FIG. 11 forms a triangular wave. However, no limitation is intended thereby, and the table address as depicted in FIG. 12 may be set such that the scanning position in the Y-direction forms a sinusoidal wave. For example, the number of table addresses ranges between 0 and 1023, and the range to be controlled in the sub-scanning direction is divided into 1024 steps. This number of divisions may be referred to as a range in the following description. When the range is wide, the position in the sub-scanning direction is divided into a larger number of divisions with a narrower width. In the present embodiment, a predetermined range is 1024. However, no limitation is intended thereby, and the number of divisions or the range may be adjusted according to, for example, a desired level of image quality or the processing speed of a central processing unit (CPU).

Figure 13:
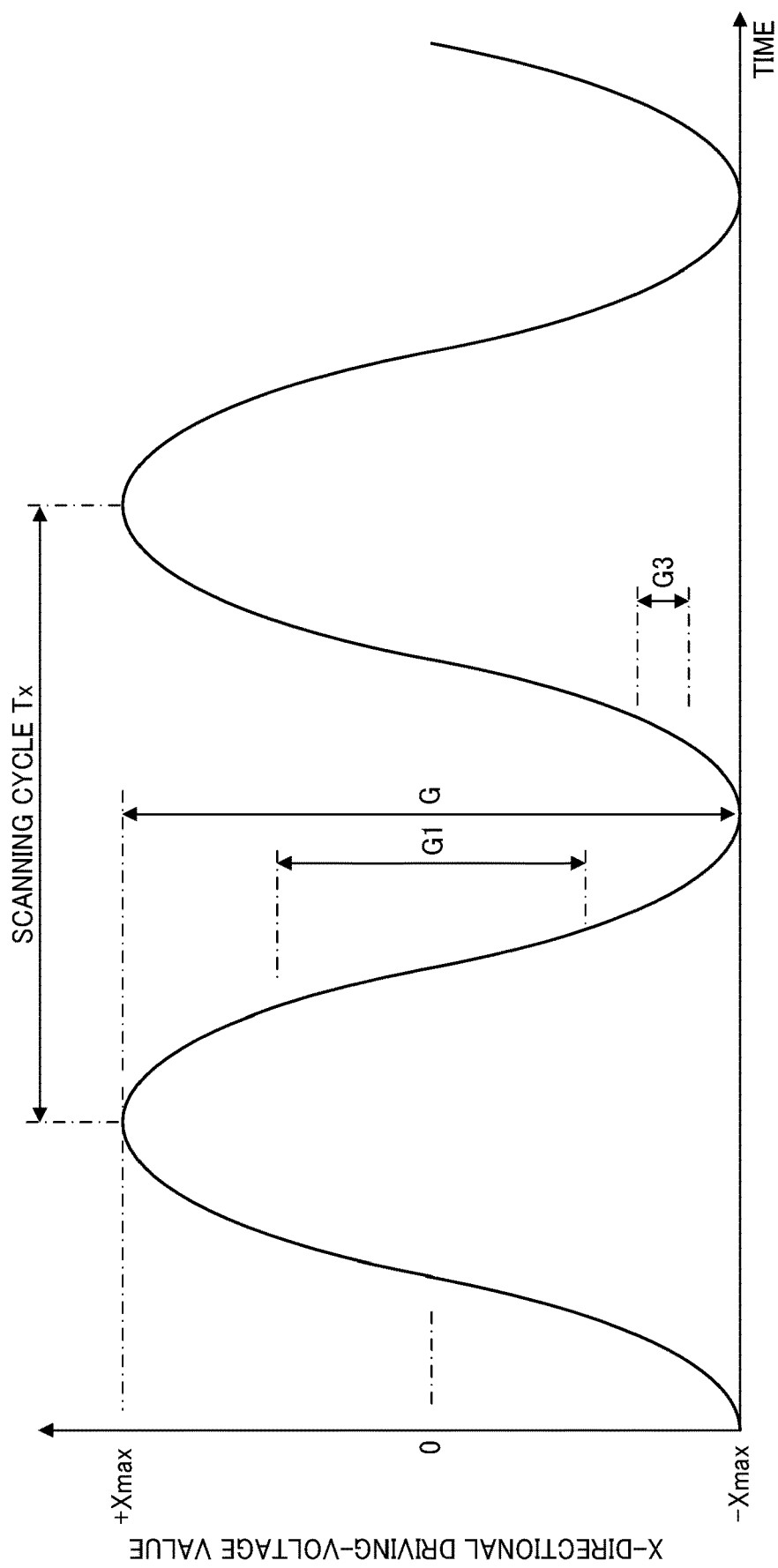
FIG. 13 is a graph of driving voltage used to drive the mirror of a light deflector in the main scanning direction, according to an embodiment of the present disclosure.

FIG. 13 is a graph of driving voltage used to drive the mirror of the light deflector 13 in the main scanning direction, according to the present embodiment.

For example, the waveform of driving voltage is generated by the light-deflector control unit 177 based on the pulse locked loop (PLL). The position when the driving voltage is "−Xmax" corresponds to the scanning position "0" in the X-direction as illustrated in FIG. 8, and the position when the driving voltage is "+Xmax" corresponds to the scanning position "$X_1$" in the X-direction as illustrated in FIG. 8.

Figure 14:
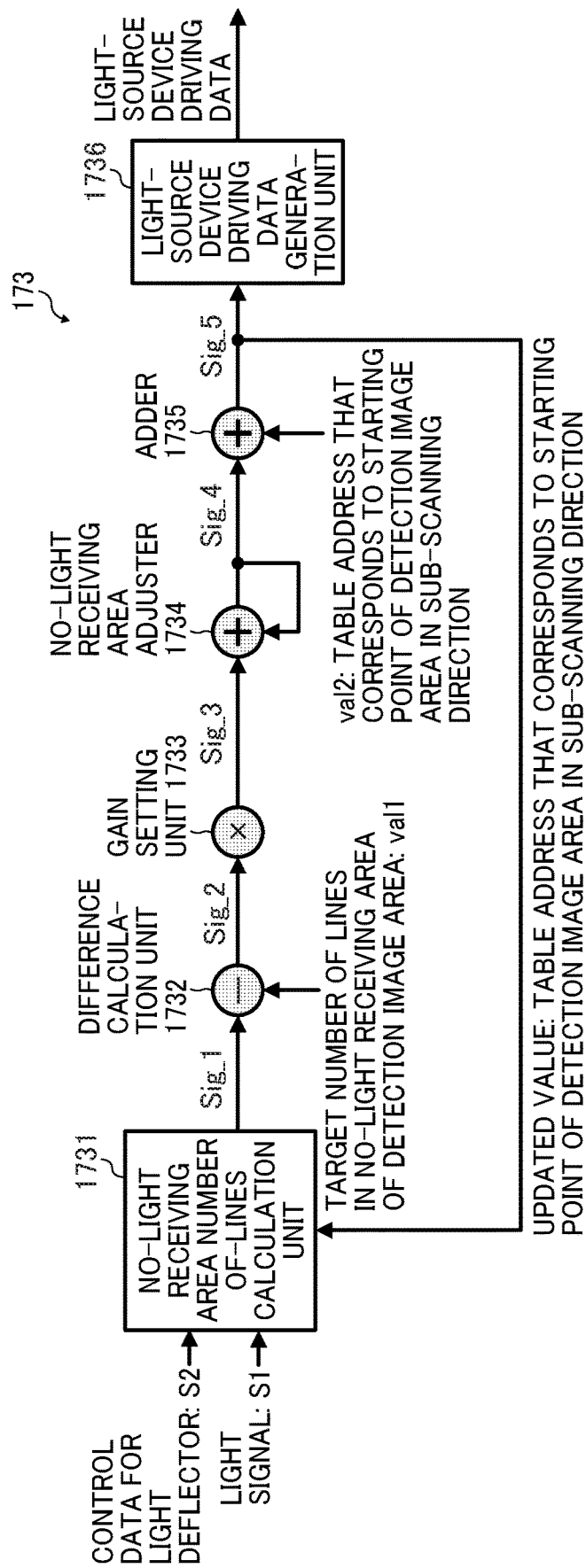
FIG. 14 is a diagram illustrating a detection image generation unit according to the first embodiment of the present disclosure.

FIG. 14 is a diagram illustrating the detection image generation unit 173 according to the first embodiment of the present disclosure.

The processes in which the detection image generation unit 173 changes the size of the no-light receiving area G4 in the Y-direction in synchronization with the cycle of a scanning frame are described below with reference to FIG. 14. More specifically, the detection image generation unit 173 reduces the size of the no-light receiving area G4 in the Y-direction in synchronization with the cycle of a scanning frame.

The detection image generation unit 173 includes a no-light receiving area number-of-lines calculation unit 1731, a difference calculation unit 1732, a gain setting unit 1733, a no-light receiving area adjuster 1734, an adder 1735, and a light-source device driving data generation unit 1736.

The no-light receiving area number-of-lines calculation unit 1731 calculates the number of lines in the no-light receiving area G4 included in the detection image area G3. For example, the no-light receiving area number-of-lines calculation unit 1731 calculates the number of lines (Sig_1) in the no-light receiving area of the detection image area G3 based on, for example:

Light-deflector control data S2 (main scanning cycle Tx, sub-scanning cycle Ty, current value of table address (tbl_adr) in conversion table, and scanning-frame synchronizing signal);

Light signal S1; and

Updated value (Sig_5): the table address that corresponds to the starting point in the sub-scanning direction, where the formation of a detection image area G3 starts.

More specifically, the number-of-lines (Sig_1) in the no-light receiving area of the detection image area G3 is expressed in the first equation given below.

$$\text{Sig\_1} = (\text{Ref} - \text{Sig\_5})/(\text{Ty}/\text{Tx} \times 2) \qquad \text{First Equation}$$

In the above equation, "Ref" denotes the table address that corresponds to the position in the sub-scanning direction, where the light receiver 61, which is a photodiode, receives scanning light for the first time. For example, the position in the sub-scanning direction that is denoted by Ref is the scanning position q in FIG. 10, and Ref indicates the value of the table address in the conversion table at the timing when the light signal S1 is received for the first time after the adjustment control of the size of the no-light receiving area G4 has started and a scanning-frame synchronizing signal is generated. Such a position in the sub-scanning direction at the timing when the light signal S1 is received from the light receiver 61 for the first time after the sub-scanning operation has started may be referred to as a light-reception detecting position in the following description. As described above, the no-light receiving area number-of-lines calculation unit 1731 according to the present embodiment calculates the size of the no-light receiving area G4 in the sub-scanning direction at some point in time, and is an example of a no-light receiving area size calculation unit.

The difference calculation unit 1732 calculates a line-number difference (Sig_2) that is the difference between the current number-of-lines (Sig_1) in the no-light receiving area of the detection image area G3 and the target number of lines in the no-light receiving area G4 (val1). As the difference is calculated as the number of lines, the processes do not depend on the value of the table address as in the conversion table in FIG. 12.

The gain setting unit 1733, which serves as a difference amplifier, amplifies the difference by multiplying the line-number difference (Sig_2) by a predetermined gain value, and outputs an amplified difference (Sig_3). Such a predetermined gain value by which the line-number difference (Sig_2) is to be multiplied indicates the rate of difference amplification. The above gain setting adjusts the length of convergence time it takes for the no-light receiving area G4 to become stable, and also changes the dimension from the number of lines to a table address.

The no-light receiving area adjuster 1734, which serves as a cumulative adder, calculates a cumulative added value obtained by integrating the amplified differences output from the gain setting unit 1733. Such a cumulative added value is calculated as the amount of change (Sig_4) in the starting point of the detection image area G3.

The adder 1735, which serves as a detection-image starting point calculation unit, adds an initial value val2 of the table address that corresponds to the starting point of the detection image area G3 in the sub-scanning direction (i.e., the value of the table address that corresponds to the scanning position m in the Y-direction as illustrated in FIG. 10), which is set in advance, to Sig_4, to generate the table address (Sig_5) that corresponds to a newly set starting point of the detection image area G3. In the following description, the starting point of the detection image area G3 in the sub-scanning direction on a scanning-frame-by-scanning-frame basis may be referred to as an area starting point.

The light-source device driving data generation unit 1736 determines a new image size of the detection image area G3 based on Sig_5 and generates image data accordingly. Then, the light-source device driving data generation unit 1736 generates driving data for the light-source device 11 such as the timing at which laser beams are to be emitted and light-emission intensity (power of light emission), based on the generated image data. The generated driving data is output to the light-source device control unit 175. The light-source device driving data generation unit 1736 is an example of an image size calculation unit and a driving data calculation unit.

As described above, according to the present embodiment, the size of the no-light receiving area G4 in the sub-scanning direction is determined by the difference between an area starting point and a light-reception detecting position. The area starting point is updated such that the size of the no-light receiving area G4 in the sub-scanning direction will be controlled within a prescribed range (predetermined number of lines), and the size of the no-light receiving area G4 in the sub-scanning direction is changed. In the present embodiment, the starting point of the detection image area G3 in the sub-scanning direction is changed to vary the size of the no-light receiving area G4 in the sub-scanning direction. Note also that changing the size of the no-light receiving area G4 in the sub-scanning direction results in changing the size of the detection image area G3, which is included in the no-light receiving area G4, in the sub-scanning direction.

A more concrete example of the processes as described above with reference to FIG. 14 is described below. For example, cases of the following conditions are described below.

Main-scanning cycle: Tx=50μ[sec]

Sub-scanning cycle: Ty=20 m [sec]

Range of Table Address in Conversion Table: 1024

The table address of the area starting point (that corresponds to the scanning direction m as illustrated in FIG. 10) of the detection image area G3: Tbl_adr=300

The table address of the detection starting point (that corresponds to the scanning position q in FIG. 10) where the light receiver initially receives light: Ref=338

Initial Number of Lines in No-light Receiving Area G4: 20

Gain value: 1

Target number of lines in no-light receiving area (val1): 3 Lines

The table Address (tbl_adr=321) that corresponds to 3 lines, which is the target number of lines The above equation "tbl_adr=321" is expressed in the following second equation.

Second Equation $$321 = Ref - \left( \frac{\text{Amount of Change in Table Address for Each Line} \times}{\text{Target Number of Lines}} \right)$$
$$= 338 - 1024/(Ty/Tx \times 2) \times 3$$
$$= 338 - 1024/(20 \text{ m}/50 \, \mu \times 2) \times 3$$

Figure 15:
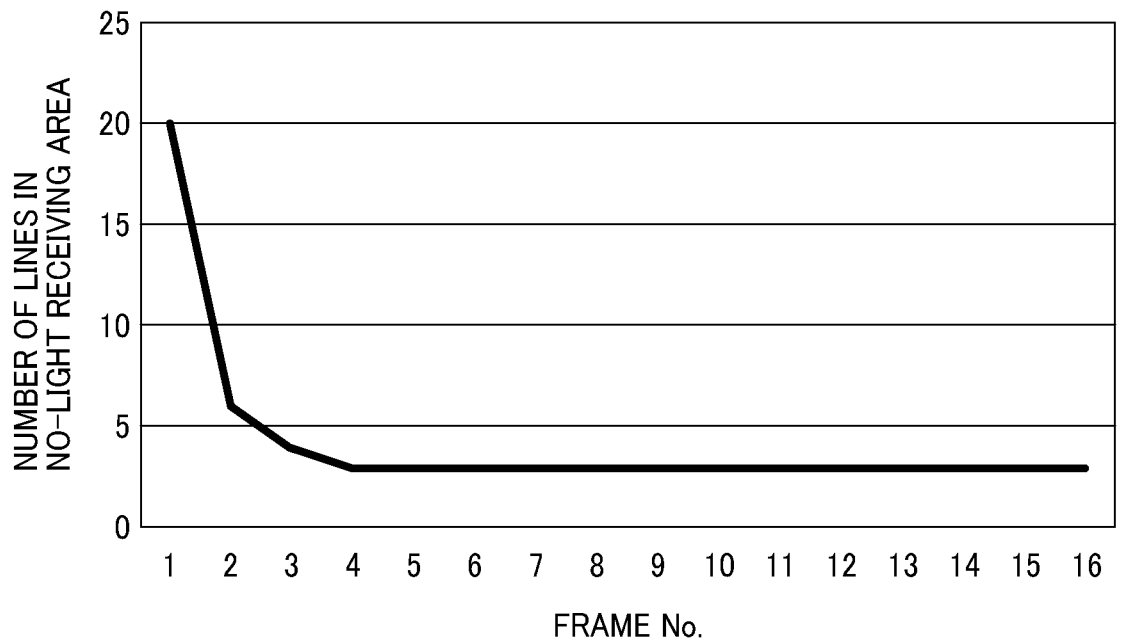
FIG. 15 is a first graph of the changes in size of a no-light receiving area included in a detection image area, according to an embodiment of the present disclosure.

FIG. 15 is a first graph of the changes in size of the no-light receiving area G4 included in the detection image area G3, according to the present embodiment.

In FIG. 15, how the number of lines in the no-light receiving area G4 changes as a result of performing the processes for each scanning frame as described above with reference to FIG. 14 is described. In a certain scanning frame (Frame No. 1), the state in which the size of the no-light receiving area G4 is 20 lines. As a result of performing the processes as described above with reference to FIG. 14, the size of the no-light receiving area G4 is changed to 6 lines in the next frame (Frame No. 2). As illustrated in FIG. 15, by performing the processes for each scanning frame as described above with reference to FIG. 14, the size of the no-light receiving area G4 gradually decreases and converges to 3 lines, i.e., the target number of lines.

Figure 16:
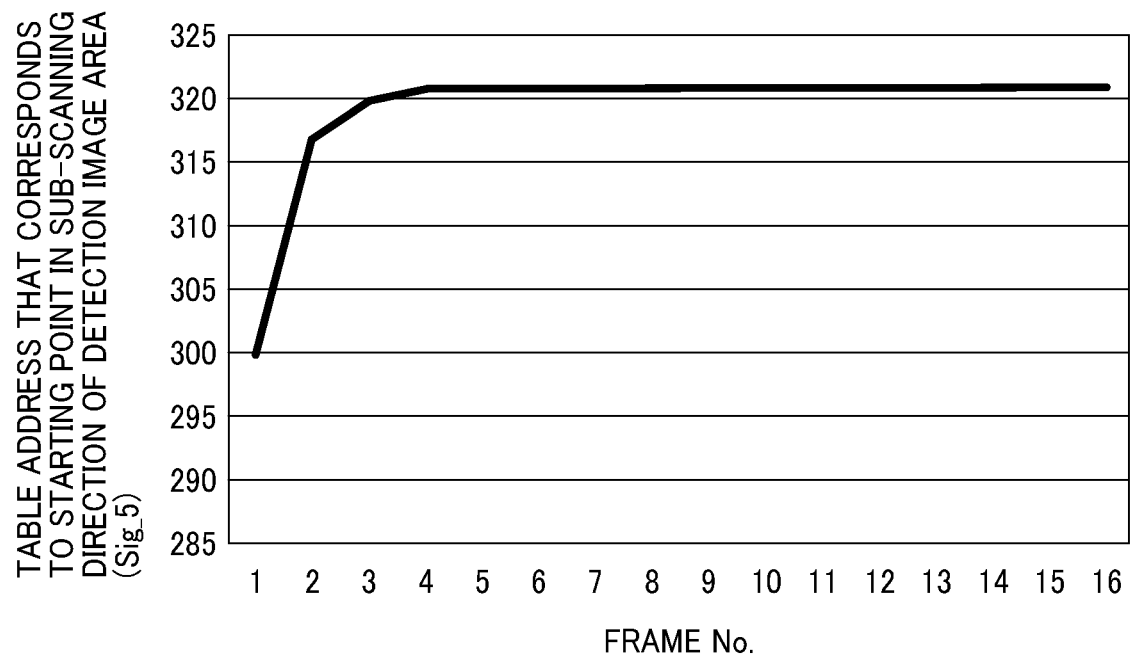
FIG. 16 is a graph of the changes in value of a table address, according to an embodiment of the present disclosure.

FIG. 16 is a second graph of the changes in size of the no-light receiving area G4 included in the detection image area G3, according to the present embodiment.

In FIG. 16, how the starting point of the detection image area G3 in the sub-scanning direction changes as a result of performing the processes for each scanning frame as described above with reference to FIG. 14 is described. As illustrated in FIG. 16, by performing the processes for each scanning frame as described above with reference to FIG. 14, the table address: tbl_adr=300 in a certain scanning frame (Frame No. 1), which indicates the starting point of the detection image area G3 in the sub-scanning direction, converges to "Table Address: tbl_adr=321" that corresponds to 3 lines, which is the target number of lines.

FIG. 17A, FIG. 17B, FIG. 17C, and FIG. 17D are first diagrams each illustrating the changes in size of the no-light receiving area G4 included in the detection image area G3, according to an embodiment of the present disclosure.

Figure 17A:
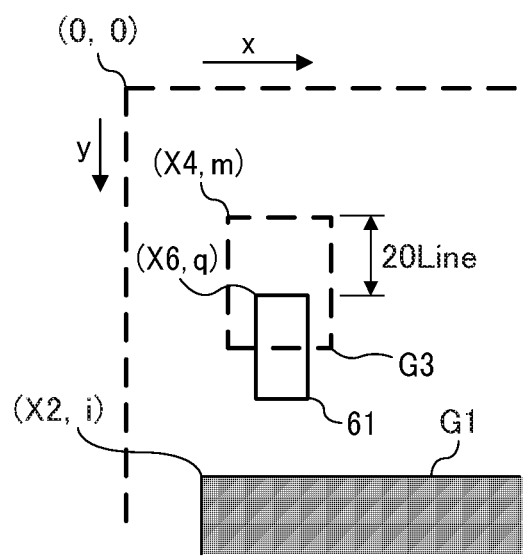
FIG. 17A, FIG. 17B, FIG. 17C, and FIG. 17D are first diagrams each illustrating the changes in size of a no-light receiving area included in a detection image area, according to an embodiment of the present disclosure.
Figure 17B:
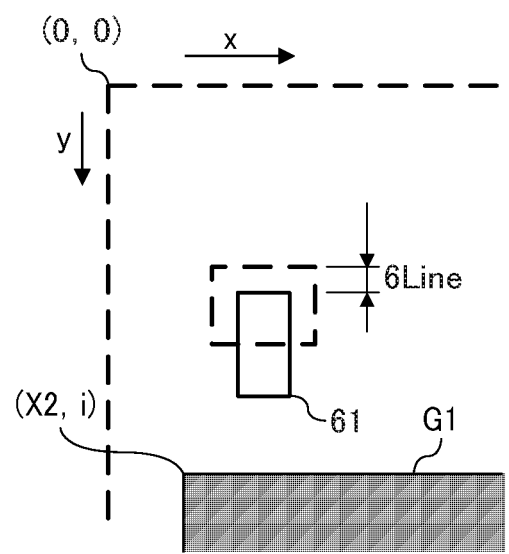
Figure 17C:
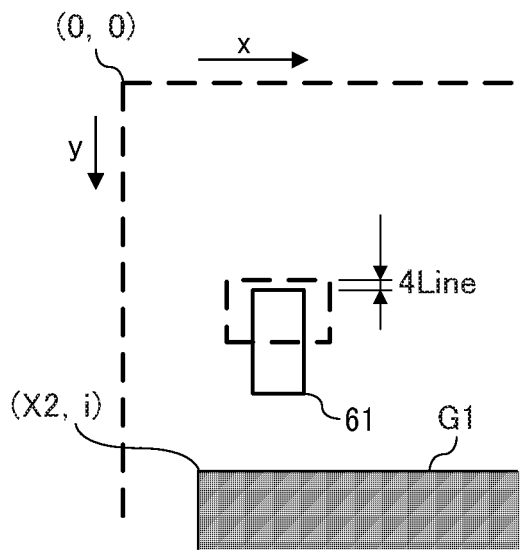
Figure 17D:
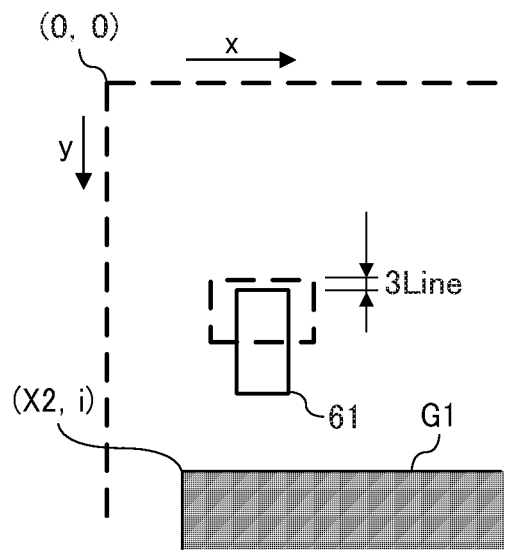

More specifically, the detection image area G3 that is formed as a result of performing the processes as described above with reference to FIG. 14 for each scanning frame is illustrated. The number of lines, which indicates the size of the no-light receiving area G4, decreases to 3 lines, i.e., the target number of lines, in the order of FIG. 17A, FIG. 17B. FIG. 17C, and then FIG. 17D. More specifically, the number of lines decreases from 20 lines to 6 lines, and then decreases from 4 lines to 3 lines. As described above, according to the present embodiment, the number of lines in the no-light receiving area G4 included in the detection image area G3 is reduced to the target number of lines, and the stray light due to the no-light receiving area G4, which may affect a display image, can efficiently be controlled.

For example, even when the size of the area in which a detection image is to be formed is decreased by terminating the formation of a detection image at the timing when the light receiver 61 detects scanning light and the light flux that forms a detection image is prevented from becoming stray light to the display image as an example of the processes of controlling stray light, the no-light receiving area G4 exists as illustrated in FIG. 10 as a part of the detection image area G3 when the detection image area G3 in which a detection image is to be formed includes the end of the light receiver 61 on the scanning-starting side in the sub-scanning direction. For this reason, this no-light receiving area G4 tends to cause stray light. By contrast, the size of the no-light receiving area G4 is reduced in the present embodiment. Due to such a configuration, the stray light due to the no-light receiving area G4 included in the detection image area G3, which may affect the display area, can efficiently be controlled.

The relation between the convergence time and the gain value as described above with reference to FIG. 14 is described below. In the first embodiment of the present disclosure as described above, a case is described in which the size of the no-light receiving area G4 in the sub-scanning direction gradually converges to a size within a predetermined range (target number of lines) in synchronization with the cycle of a scanning frame. Such convergence time depends on the setting of gain value, and the gain value is configured at "1" in the first embodiment of the present disclosure. However, no limitation is indicated thereby, and the length of convergence time may be changed by changing the gain value.

Figure 18:
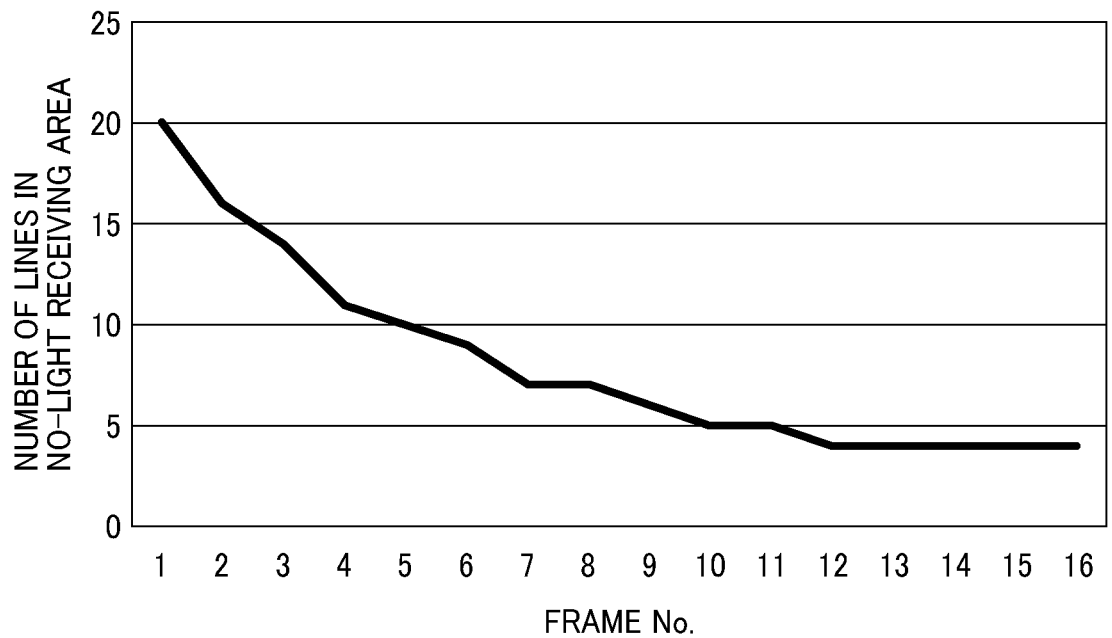
FIG. 18 is a second graph of the changes in size of a no-light receiving area included in a detection image area, according to an embodiment of the present disclosure.
Figure 19:
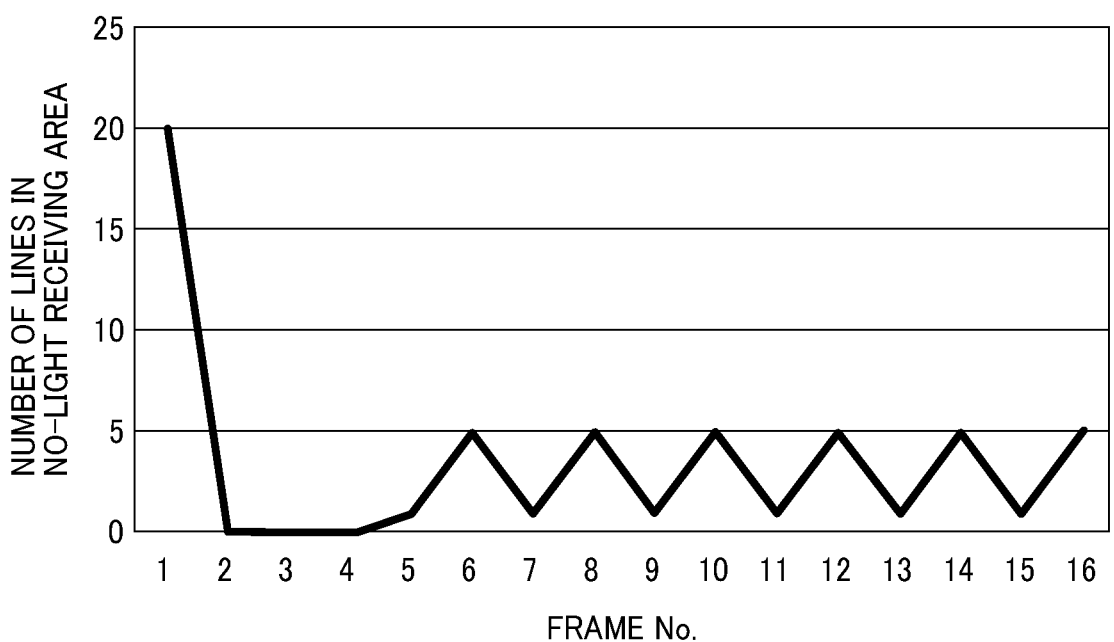
FIG. 19 is a third graph of the changes in size of a no-light receiving area included in a detection image area, according to an embodiment of the present disclosure.

For example, FIG. 18 illustrates a case where the gain value is relatively small. In the case of FIG. 18, the length of convergence time tends to be long as the gain value is small, but the degree of stability increases. By contrast. FIG. 19 illustrates a case where the gain value is relatively large. Although the length of convergence time is shorter when the gain value is larger, FIG. 19 illustrates a cases in which divergence occurs due to a too large gain value. The processes of controlling the convergence time to converge in a short time and in a stable manner are described below as a second embodiment of the present disclosure.

Figure 20:
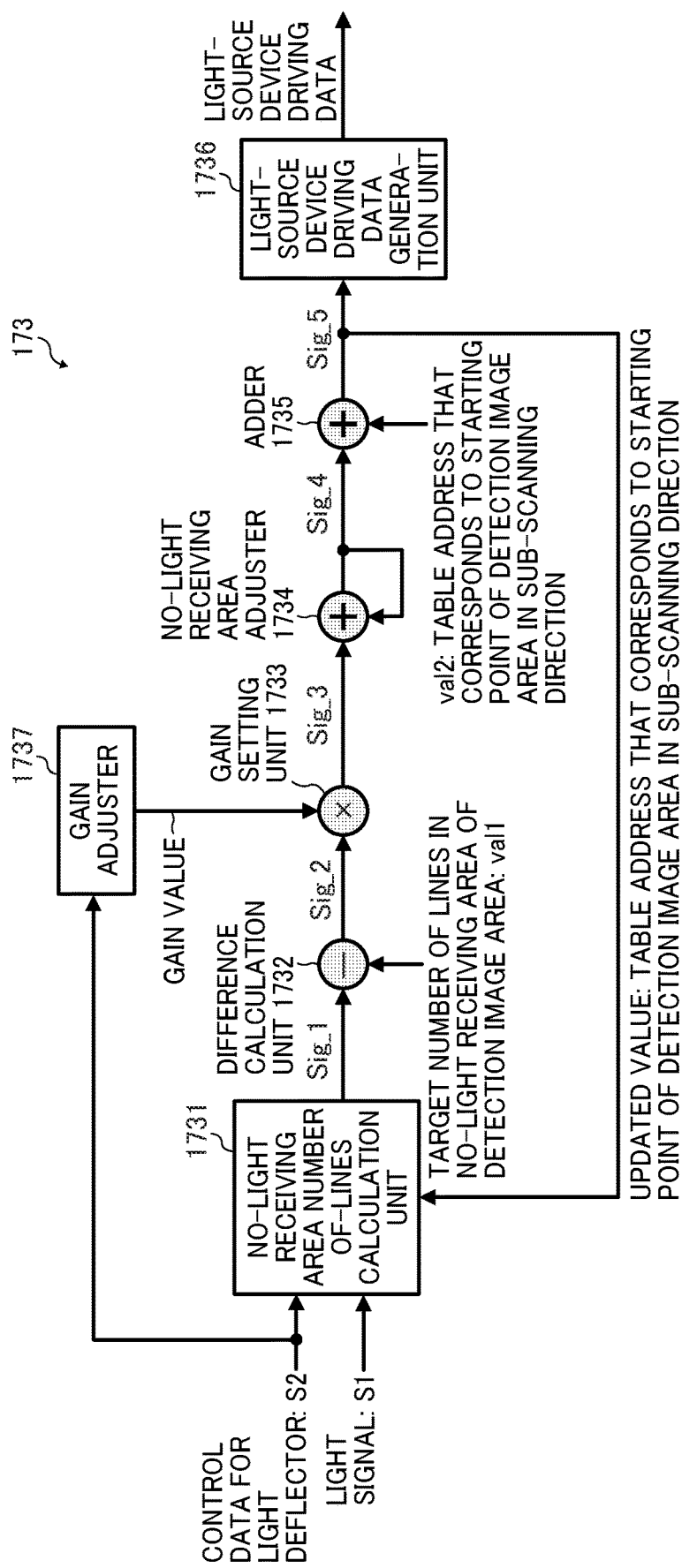
FIG. 20 is a diagram illustrating a detection image generation unit according to a second embodiment of the present disclosure.

FIG. 20 is a diagram illustrating the detection image generation unit 173 according to the second embodiment of the present disclosure.

Note that the system configuration, hardware configuration, and the functional configuration according to the first embodiment of the present disclosure may be applied to the system configuration, hardware configuration, and the functional configuration of the present embodiment. For the sake of explanatory convenience, the description of the system configuration, hardware configuration, and the functional configuration of the present embodiment is omitted as these configurations are similar to those as described above with reference to FIG. 1 to FIG. 13.

The detection image generation unit 173 includes a no-light receiving area number-of-lines calculation unit 1731, a difference calculation unit 1732, a gain setting unit 1733, a no-light receiving area adjuster 1734, an adder 1735, and a light-source device driving data generation unit 1736.

The no-light receiving area number-of-lines calculation unit 1731 calculates the number of lines in the no-light receiving area G4 included in the detection image area G3. For example, the no-light receiving area number-of-lines calculation unit 1731 calculates the number of lines (Sig_1) in the no-light receiving area of the detection image area G3 based on, for example:

Light-deflector control data S2 (main scanning cycle Tx, sub-scanning cycle Ty, current value of table address (tbl_adr) in conversion table, which indicates the position in the sub-scanning direction, and scanning-frame synchronizing signal);

Light signal S1; and

Updated value of the table address (Sig_5) that corresponds to the starting point of the detection image area G3.

More specifically, "Sig_1" is expressed in the third equation given below.

$$Sig\_1 = (Ref - Sig\_5)/(Ty/Tx \times 2) \qquad \text{Third Equation}$$

In the above equation, "Ref" denotes the table address that corresponds to the position in the sub-scanning direction, where the light receiver 61, which is a photodiode, receives scanning light for the first time. For example, the position in the sub-scanning direction that is denoted by Ref is the scanning position q in FIG. 10, and Ref indicates the value of the table address in the conversion table at the timing when the light signal S1 is received for the first time after the adjustment control of the size of the no-light receiving area G4 has started and a scanning-frame synchronizing signal is generated. Such a position in the sub-scanning direction at the timing when the light signal S is received from the light receiver 61 for the first time after the sub-scanning operation has started may be referred to as a detection starting point in the following description. As described above, the no-light receiving area number-of-lines calculation unit 1731 according to the present embodiment calculates the size of the no-light receiving area G4 in the sub-scanning direction at some point in time, and is an example of a no-light receiving area size calculation unit.

The difference calculation unit 1732 calculates a line-number difference (Sig_2) that is the difference between the target number of lines in the no-light receiving area G4 (val1) and the current number of lines (Sig_1) in the no-light receiving area of the detection image area G3. As the difference is calculated as the number of lines, the processes do not depend on the value of the table address as in the conversion table in FIG. 12.

The gain setting unit 1733, which serves as a difference amplifier, amplifies the difference by multiplying the line-number difference (Sig_2) by a predetermined gain value, and outputs an amplified difference (Sig_3). Such a predetermined gain value by which the line-number difference (Sig_2) is to be multiplied indicates the rate of difference amplification. The above gain setting adjusts the length of convergence time it takes for the no-light receiving area G4 to become stable, and also changes the dimension from the number of lines to a table address.

The gain adjuster 1737 adjusts the gain value based on the light-deflector control data (S2) as in a fourth equation given below.

Gain Value=Table Address Range/(Ty/Tx×2)     Fourth Equation

In the case of the present embodiment, the table address range is 1024. The gain value in the present embodiment indicates the amount of change in the table address for each line. When the gain value in the present embodiment matches the amount of change in the table address for each line, the number of lines in the no-light receiving area converges to the target number of lines in the second frame. When a gain value that is larger than the value in the present embodiment is set, the number of lines diverges.

The no-light receiving area adjuster 1734, which serves as a cumulative adder, calculates a cumulative added value obtained by integrating the amplified differences output from the gain setting unit 1733. Such a cumulative added value is calculated as the amount of change (Sig_4) in the starting point of the detection image area G3.

The adder 1735, which serves as a detection-image starting point calculation unit, adds an initial value val2 of the table address that corresponds to the starting point of the detection image area G3 in the sub-scanning direction (i.e., the value of the table address that corresponds to the scanning position m in the Y-direction as illustrated in FIG. 10), which is set in advance, to Sig_4, to generate the table address (Sig_5) that corresponds to a newly set starting point of the detection image area G3. In the following description, the starting point of the detection image area G3 in the sub-scanning direction on a scanning-frame-by-scanning-frame basis may be referred to as an area starting point.

As described above, according to the present embodiment, the size of the no-light receiving area G4 in the sub-scanning direction is determined by the difference between an area starting point and a light-reception detecting position. The area starting point is updated such that the size of the no-light receiving area G4 in the sub-scanning direction will be controlled within a prescribed range (predetermined number of lines), and the size of the no-light receiving area G4 in the sub-scanning direction is changed. In the present embodiment, the starting point of the detection image area G3 in the sub-scanning direction is changed to vary the size of the no-light receiving area G4 in the sub-scanning direction. Note also that changing the size of the no-light receiving area G4 in the sub-scanning direction results in changing the size of the detection image area G3, which is included in the no-light receiving area G4, in the sub-scanning direction.

The light-source device driving data generation unit 1736 determines a new image size of the detection image area G3 based on Sig_5 and generates image data accordingly. Then, the light-source device driving data generation unit 1736 generates driving data for the light-source device 11 such as the timing at which laser beams are to be emitted and light-emission intensity (power of light emission), based on the generated image data. The generated driving data is output to the light-source device control unit 175.

In addition to the advantageous effects achieved in the first embodiment of the present disclosure, according to the second embodiment of the present disclosure, the gain control is enabled in which the convergence time is controlled to converge in a short time and in a stable manner, using the main-scanning cycle Tx, the sub-scanning cycle Ty, the current value of the table address (tbl_adr) in the conversion table, and a scanning-frame synchronizing signal, each of which is an example of the light-deflector control data (S2).

A more concrete example of the processes as described above with reference to FIG. 20 is described below. For example, cases of the following conditions are described below.

Main-scanning cycle: Tx=50 μm [sec]
   Sub-scanning cycle: Ty=20 m [sec]
   Range of Table Address in Conversion Table: 1024
   The table address of the area starting point (that corresponds to the scanning direction m as illustrated in FIG. 10) of the detection image area G3: tbl_adr=300
   The table address of the position (that corresponds to the scanning position q in FIG. 10) where the photodiode initially receives light: Ref=338
   Initial Number of Lines in No-light Receiving Area G4: 20
   Gain Setting: 1.28=1024/(20 m/50μ×2)
   Target number of lines in no-light receiving area (val1): 3
   The table Address (tbl_adr=321) that corresponds to 3 lines, which is the target number of lines The above equation "tbl_adr=321" is expressed in the following fifth equation.

Fifth Equation $$321 = Ref - \left( \frac{\text{Amount of Change in Table Address for Each Line} \times}{\text{Target Number of Lines}} \right)$$
$$= 338 - 1024/(Ty/Tx \times 2) \times 3$$
$$= 338 - 1024/(20 \text{ m}/50 \, \mu \times 2) \times 3$$

Figure 21:
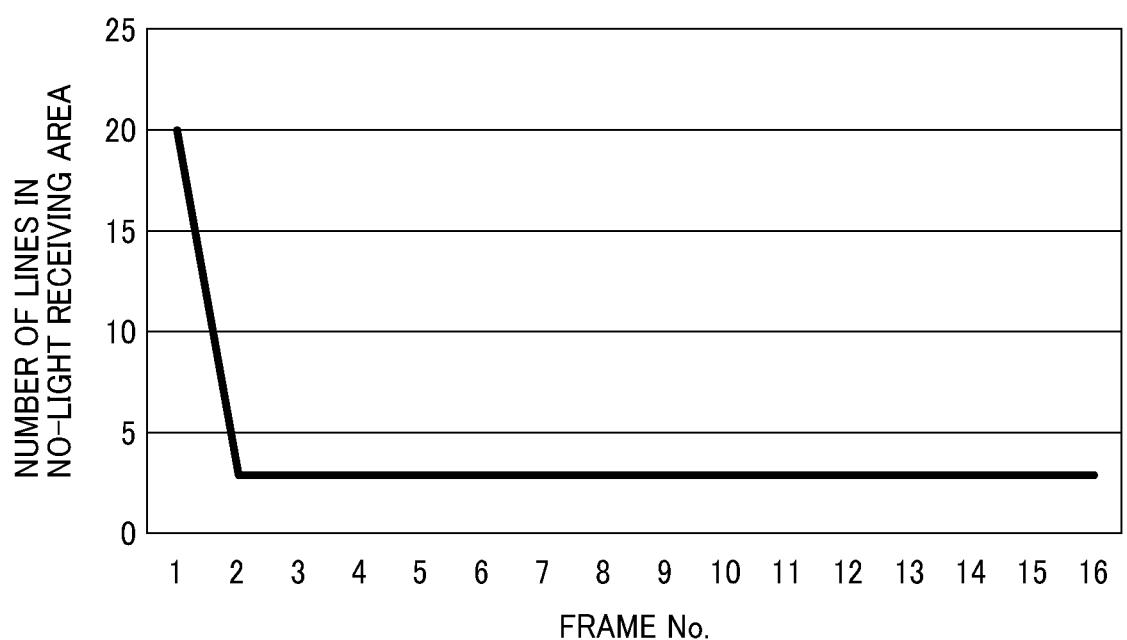
FIG. 21 is a fourth graph of the changes in size of a no-light receiving area included in a detection image area, according to an embodiment of the present disclosure.

FIG. 21 is a fourth graph of the changes in size of the no-light receiving area G4 included in the detection image area G3, according to the present embodiment.

In FIG. 21, how the number of lines in the no-light receiving area G4 changes as a result of performing the processes for each scanning frame as described above with reference to FIG. 20 is described. In a certain scanning frame (Frame No. 1), the state in which the size of the no-light receiving area G4 is 20 lines. As illustrated in FIG. 21, as a result of performing the processes as described above with reference to FIG. 20, the size of the no-light receiving area G4 converges to 3 lines, i.e., the target number of lines, in the next frame (Frame No. 2).

The main-scanning cycle Tx and the sub-scanning cycle Ty, which are examples of the amplitude characteristics, of the mirror 130 also change due to the temperature or the changes over time. In the second embodiment of the present disclosure, the gain value that enables the fastest convergence is set in view of the main-scanning cycle Tx and the sub-scanning cycle Ty, each of which changes. Due to this configuration, stray light can be prevented from occurring even when the amplitude characteristics of the mirror 130 change due to the changes in temperature or the changes over time.

The displacements in the relative positions of the light receiver 61 and the detection image area G3 are described below. For example, when the display device 100 oscillates for some reason while the controlling processes according to the first embodiment of the present disclosure are being performed, the relative positions of the light receiver 61 and the detection image area G3 may change.

FIG. 22A, FIG. 22B, FIG. 22C, FIG. 22D, and FIG. 22E are second diagrams each illustrating the changes in size of the no-light receiving area G4 included in the detection image area G3, according to the present embodiment.

FIG. 22A illuminates a stable state in which the no-light receiving area G4 is under control as described above according to the first embodiment of the present disclosure. FIG. 22B, FIG. 22C, and FIG. 22D illustrate situations in which the relative positions of the light receiver 61 and the detection image area G3 are changed due to the vibration to the display device 100. FIG. 22E illustrates a state after the vibration ceases, where the size of the no-light receiving area G4 is reduced again by the size controlling processes performed on the no-light receiving area G4.

In the state where the display device 100 is vibrating as in FIG. 22B. FIG. 22C, and FIG. 22D, the light receiver 61 and the detection field overlaps with the detection image area G3. However, the end of the light receiver 61 and the detection field on the scanning-starting side in the sub-scanning direction goes out of the detection image area G3, and thus the light receiver 61 cannot accurately detect the timing at which scanning light is initially received in the detection image area G3. Under such conditions, the width of oscillation of the mirror 130 cannot accurately be controlled through the use of the light receiver 61. As a result, the quality of the display image may deteriorate.

Figure 23:
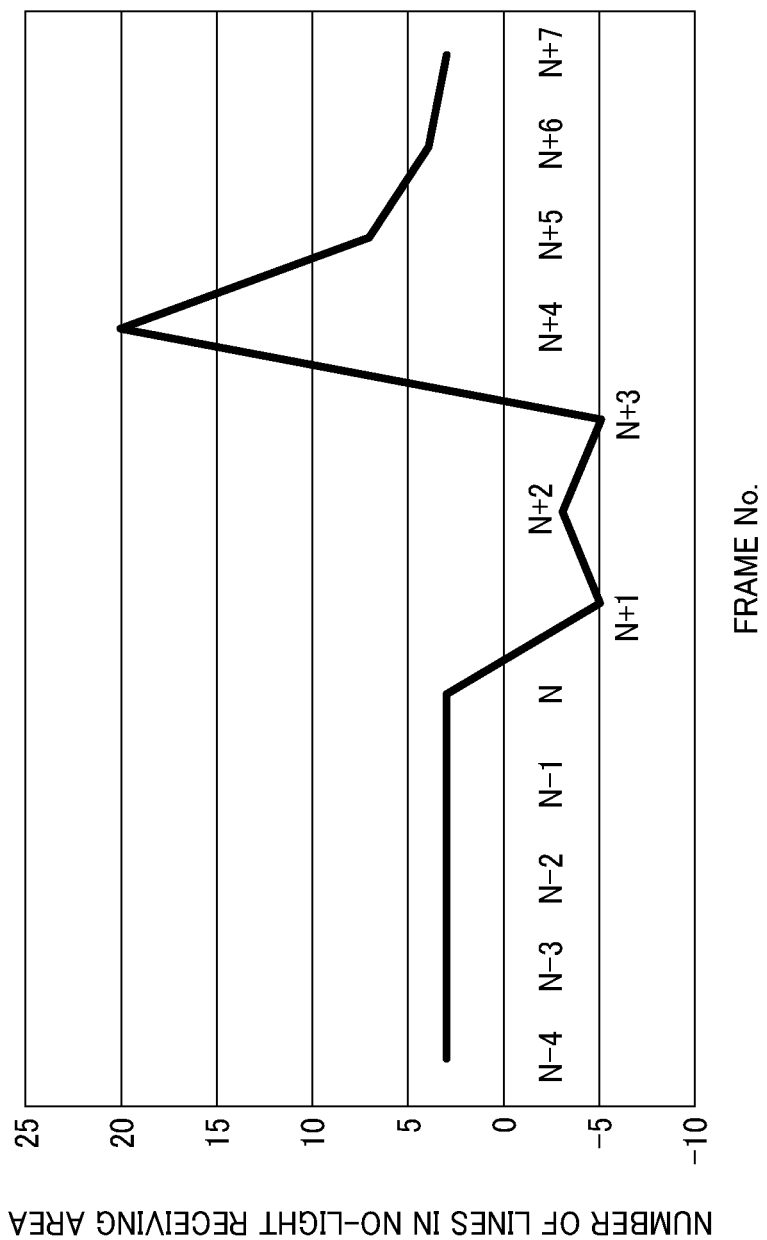
FIG. 23 is a fifth graph of the changes in size of a no-light receiving area included in a detection image area, according to an embodiment of the present disclosure.

FIG. 23 is a fifth graph of the changes in size of the no-light receiving area G4 included in the detection image area G3, according to the present embodiment.

More specifically, FIG. 23 illustrates how the number-of-lines in the no-light receiving area G4 changes when vibration is caused as described above with reference to FIG. 22A. FIG. 22B, FIG. 22C, FIG. 22D, and FIG. 22E. As illustrated in FIG. 23, the no-light receiving area G4 is under control in a stable manner in the N−1-th and N-th frames, and vibration occurs in the N+1-th, N+2-th, and the N+3-th frames. Further, the size of the no-light receiving area G4 becomes controllable again in the N+4-th and the following frames where the vibration is ceased.

When the display device 100 is vibrating as described above with reference to FIG. 22A, FIG. 22B, FIG. 22C, FIG. 22D, FIG. 22E, and FIG. 23, the number-of-lines in the no-light receiving area G4 takes on a negative value. In order to deal with such a situation, in a third embodiment of the present disclosure as will be described below, it is determined that the display device 100 is vibrating and the detection image area G3 is initialized when the number-of-lines in the no-light receiving area G4 takes on a negative value, i.e., when the number-of-lines in the no-light receiving area G4 is smaller than "0." In other words, when the light receiver 61 and the detection field overlap with the detection image area G3 but the end of the light receiver 61 and the detection field on the scanning-starting side in the sub-scanning direction goes out of the detection image area G3, the size of the detection image area G3 is increased such that the detection image area G3 includes the ends of the light receiver 61 and the detection field on the scanning-starting side in the sub-scanning direction. Due to such a configuration, the scanning light that scans the detection field can be detected by the light receiver 61 with reliability. In the third embodiment of the present disclosure as will be described later in detail, stray light is controlled while reducing the influence of vibration.

Figure 24:
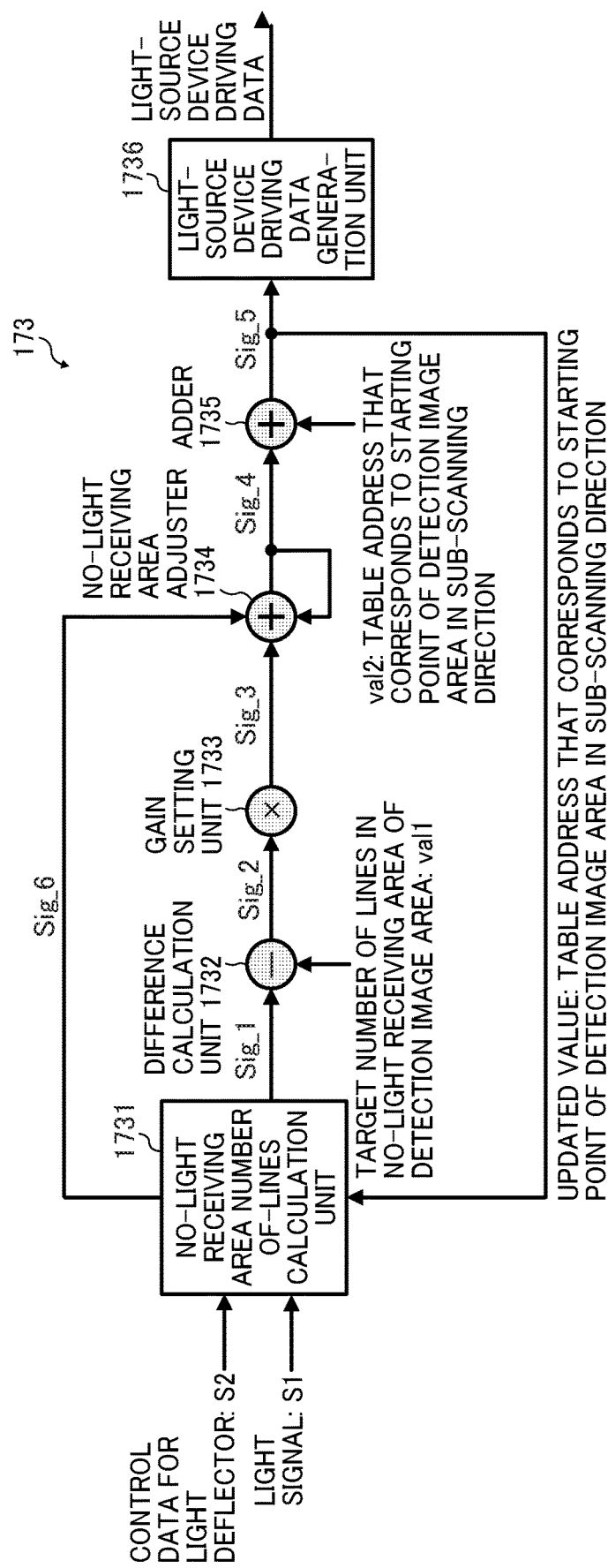
FIG. 24 is a diagram illustrating a detection image generation unit according to a third embodiment of the present disclosure.

FIG. 24 is a diagram illustrating the detection image generation unit 173 according to the third embodiment of the present disclosure.

Note that the system configuration, hardware configuration, and the functional configuration according to the first embodiment of the present disclosure may be applied to the system configuration, hardware configuration, and the functional configuration of the present embodiment. For the sake of explanatory convenience, the description of the system configuration, hardware configuration, and the functional configuration of the present embodiment is omitted as these configurations are similar to those as described above with reference to FIG. 1 to FIG. 13.

The processes in which the detection image generation unit 173 reduces the size of the no-light receiving area G4 as illustrated in FIG. 10 in the Y-direction in synchronization with the cycle of a scanning frame are described below with reference to FIG. 24.

The detection image generation unit 173 includes a no-light receiving area number-of-lines calculation unit 1731, a difference calculation unit 1732, a gain setting unit 1733, a no-light receiving area adjuster 1734, an adder 1735, and a light-source device driving data generation unit 1736.

The no-light receiving area number-of-lines calculation unit 1731 calculates the number of lines in the no-light receiving area G4 included in the detection image area G3. For example, the no-light receiving area number-of-lines calculation unit 1731 calculates the number of lines (Sig_1) in the no-light receiving area of the detection image area G3 based on, for example:

Light-deflector control data S2 (main scanning cycle Tx, sub-scanning cycle Ty, current value of table address (tbl_adr) in conversion table, and scanning-frame synchronizing signal);

Light signal S1; and

Updated table address (Sig_5) that corresponds to the starting point at which the formation of a detection image area G3 starts.

More specifically, "Sig_1" is expressed in the sixth equation given below.

$$\text{Sig\_1}=(\text{Ref}-\text{Sig\_5})/(Ty,Tx\times 2) \qquad \text{Sixth Equation}$$

In the above equation, "Ref" denotes the table address that corresponds to the position in the sub-scanning direction, where the light receiver 61, which is a photodiode, receives scanning light for the first time. For example, the position in the sub-scanning direction that is denoted by Ref is the scanning position q in FIG. 10, and Ref indicates the value of the table address in the conversion table at the timing when the light signal S1 is received for the first time after the adjustment control of the size of the no-light receiving area G4 has started and a scanning-frame synchronizing signal is generated. Such a position in the sub-scanning direction at the timing when the light signal S1 is received for the first time after the sub-scanning operation has started may be referred to as a detection starting point in the following description. As described above, the no-light receiving area number-of-lines calculation unit 1731 according to the present embodiment calculates the size of the no-light receiving area G4 in the sub-scanning direction at some point in time, and is an example of a no-light receiving area size calculation unit.

When "Ref−Sig_5<0," the no-light receiving area number-of-lines calculation unit 1731 determines that vibration has occurred. Then, the no-light receiving area number-of-lines calculation unit 1731 generates a reset signal Sig_6 to reset the integration circuit of the no-light receiving area adjuster 1734 to zero. As the integration circuit is reset, the table address Sig_5 that corresponds to the starting point of the detection image area G3 in the sub-scanning direction is initialized to the initial value val2 of the table address that corresponds to the starting point of the detection image area G3.

The difference calculation unit 1732 calculates a line-number difference (Sig_2) that is the difference between the target number of lines in the no-light receiving area G4 (val1) and the current number of lines (Sig_1) in the no-light receiving area of the detection image area G3. As the difference is calculated as the number of lines, the processes do not depend on the value of the table address as in the conversion table in FIG. 12.

The gain setting unit 1733, which serves as a difference amplifier, amplifies the difference by multiplying the line-number difference (Sig_2) by a predetermined gain value, and outputs an amplified difference (Sig_3). Such a predetermined gain value by which the line-number difference (Sig_2) is to be multiplied indicates the rate of difference amplification. The above gain setting adjusts the length of convergence time it takes for the no-light receiving area G4 to become stable, and also changes the dimension from the number of lines to a table address.

The no-light receiving area adjuster 1734, which serves as a cumulative adder, calculates a cumulative added value obtained by integrating the amplified differences output from the gain setting unit 1733. Such a cumulative added value is calculated as the amount of change (Sig_4) in the starting point of the detection image area G3.

The no-light receiving area adjuster 1734 integrates the past line-number differences to calculate the amount of change (Sig_4) in the starting point of the detection image area G3.

The adder 1735, which serves as a detection-image starting point calculation unit, adds an initial value val2 of the table address that corresponds to the starting point of the detection image area G3 in the sub-scanning direction (i.e., the value of the table address that corresponds to the scanning position m in the Y-direction as illustrated in FIG. 10), which is set in advance, to Sig_4, to generate the table address (Sig_5) that corresponds to a newly set starting point of the detection image area G3. In the following description, the starting point of the detection image area G3 in the sub-scanning direction on a scanning-frame-by-scanning-frame basis may be referred to as an area starting point.

As described above, according to the present embodiment, the size of the no-light receiving area G4 in the sub-scanning direction is determined by the difference between an area starting point and a light-reception detecting position. The area starting point is updated such that the size of the no-light receiving area G4 in the sub-scanning direction will be controlled within a prescribed range (predetermined number of lines), and the size of the no-light receiving area G4 in the sub-scanning direction is changed. In the present embodiment, the starting point of the detection image area G3 in the sub-scanning direction is changed to vary the size of the no-light receiving area G4 in the sub-scanning direction. Note also that changing the size of the no-light receiving area G4 in the sub-scanning direction results in changing the size of the detection image area G3, which is included in the no-light receiving area G4, in the sub-scanning direction.

The light-source device driving data generation unit 1736 determines a new image size of the detection image area G3 based on Sig_5 and generates image data accordingly. Then, the light-source device driving data generation unit 1736 generates driving data for the light-source device 11 such as the timing at which laser beams are to be emitted and light-emission intensity (power of light emission), based on the generated image data. The generated driving data is output to the light-source device control unit 175.

FIG. 25A, FIG. 25B, FIG. 25C, FIG. 25D, and FIG. 25E are third diagrams each illustrating the changes in size of the no-light receiving area G4 included in the detection image area G3, according to the present embodiment.

When vibration occurs in the N+1-th frame, Ref–Sig_5<0. In response to that, the no-light receiving area number-of-lines calculation unit 1731 that calculates the number of lines in the no-light receiving area G4 included in the detection image area G3 generates a reset signal Sig_6 to reset the integration circuit of the no-light receiving area adjuster 1734.

As the integration circuit is reset, the table address Sig_5 that corresponds to the starting point of a detection image area G3 is initialized to the initial value val2 of the table address that corresponds to the starting point of the detection image area G3. In other words, the number of lines in the no-light receiving area is initialized to the initial no-light receiving area number-of-lines (20 lines).

Figure 25A:
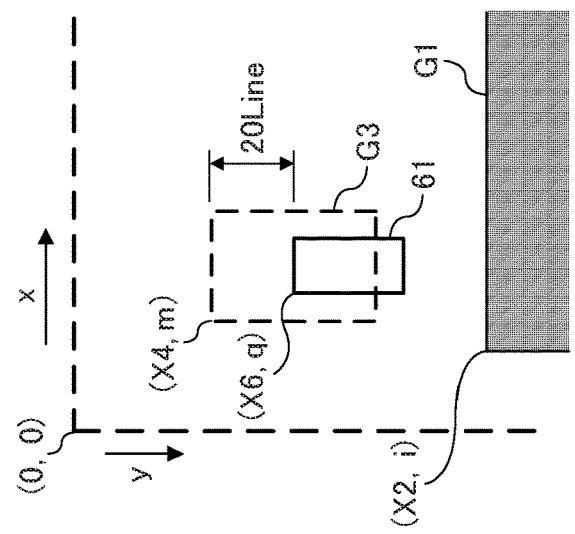
FIG. 25A, FIG. 25B, FIG. 25C, FIG. 25D, and FIG. 25E are third diagrams each illustrating the changes in size of a no-light receiving area included in a detection image area, according to an embodiment of the present disclosure.
Figure 25B:
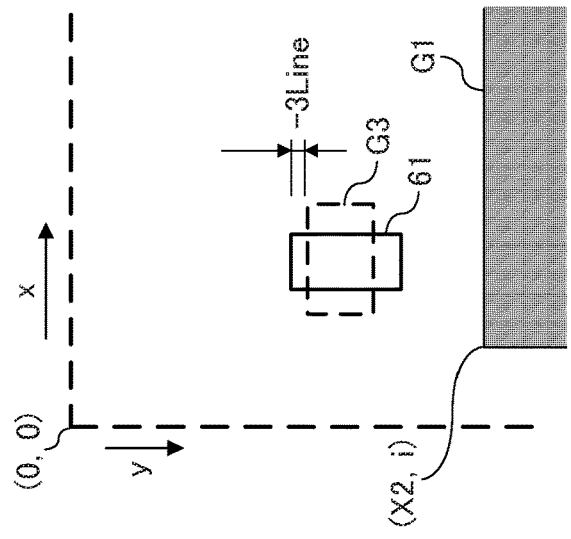
Figure 25C:
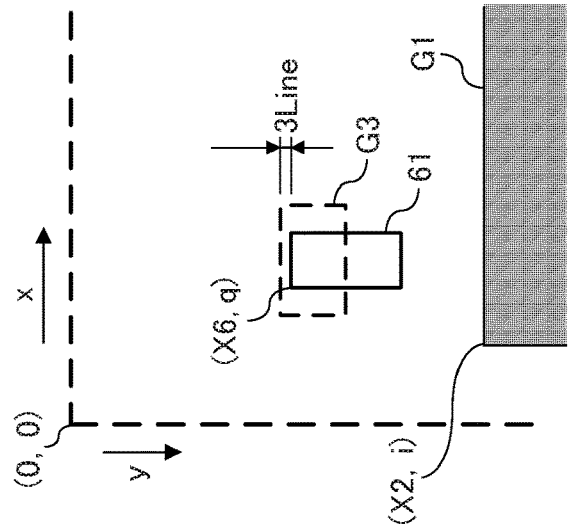
Figure 25D:
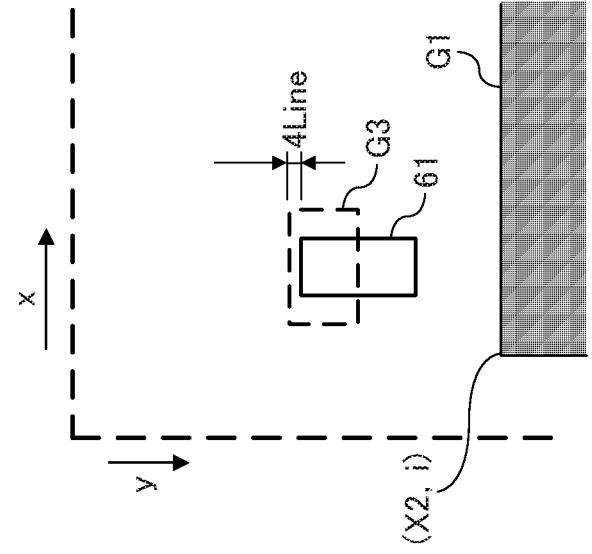
Figure 25E:
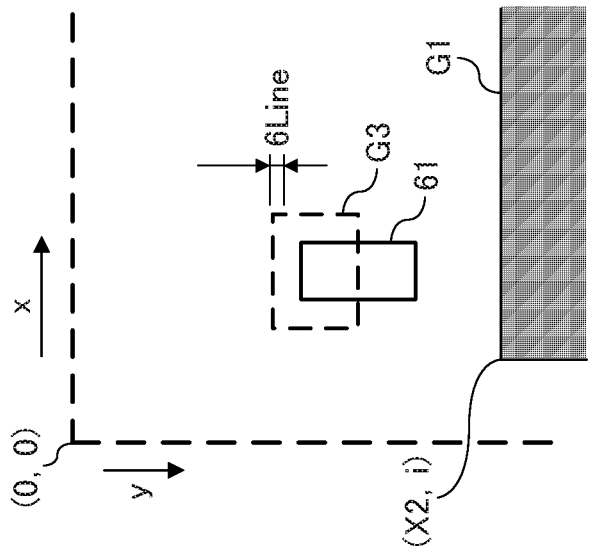

More specifically, in the state as illustrated in FIG. 25A, the number-of-lines "Ref–Sig_5" in the no-light receiving area is three, which is a positive value. By contrast, in the state as illustrated in FIG. 25B, the number-of-lines "Ref–Sig_5" in the no-light receiving area is minus three, which is a negative value. Then, the number of lines in the no-light receiving area is initialized as described above. As a result, as illustrated in FIG. 25C, the number of lines in the no-light receiving area becomes 20.

How the relative positions of the light receiver 61 and the detection image area G3, which appear within the range of the scanning area G, changes in the above transition is described below. FIG. 25A indicates a state in which the detection image area G3 includes the end of the light receiver 61 on the scanning-starting side in the sub-scanning direction. By contrast, FIG. 25B indicates a state in which the light receiver 61 and the detection field overlaps with the detection image area G3 but the detection image area G3 no longer includes the end of the light receiver 61 and the detection field on the scanning-starting side in the sub-scanning direction. Then, the number of lines in the no-light receiving area is initialized as described above. As a result, as illustrated in FIG. 25C, the size of the no-light receiving area G4, which has been gradually reduced up to this point, is changed to increase. As a result, again, the detection image area G3 includes the end of the light receiver 61 on the scanning-starting side in the sub-scanning direction.

As described above, after a state in which the detection image area G3 on which a detection image is to be formed includes the end of the light receiver 61 on the scanning-starting side in the sub-scanning direction has turned to a state in which the detection image area G3 on which a detection image is to be formed no longer includes the end of the light receiver 61 on the scanning-starting side in the sub-scanning direction after the size of the no-light receiving area G4 in the sub-scanning direction is reduced, the size of the detection image area G3 in the sub-scanning direction that has been once reduced increases again. Due to such a configuration, even when vibration occurs, the detection image area G3 is controlled to keep including an end of the light receiver 61 in the sub-scanning direction, and the oscillation control of the mirror 130 can be performed by the light receiver 61. In other words, when the light receiver 61 and the detection field overlap with the detection image area G3 but the end of the light receiver 61 and the detection field on the scanning-starting side in the sub-scanning direction goes out of the detection image area G3, the size of the detection image area G3 is increased such that the detection image area G3 includes the ends of the light receiver 61 and the detection field on the scanning-starting side in the sub-scanning direction. Due to such a configuration, the scanning light that scans the detection field can be detected by the light receiver 61 with reliability.

Figure 26:
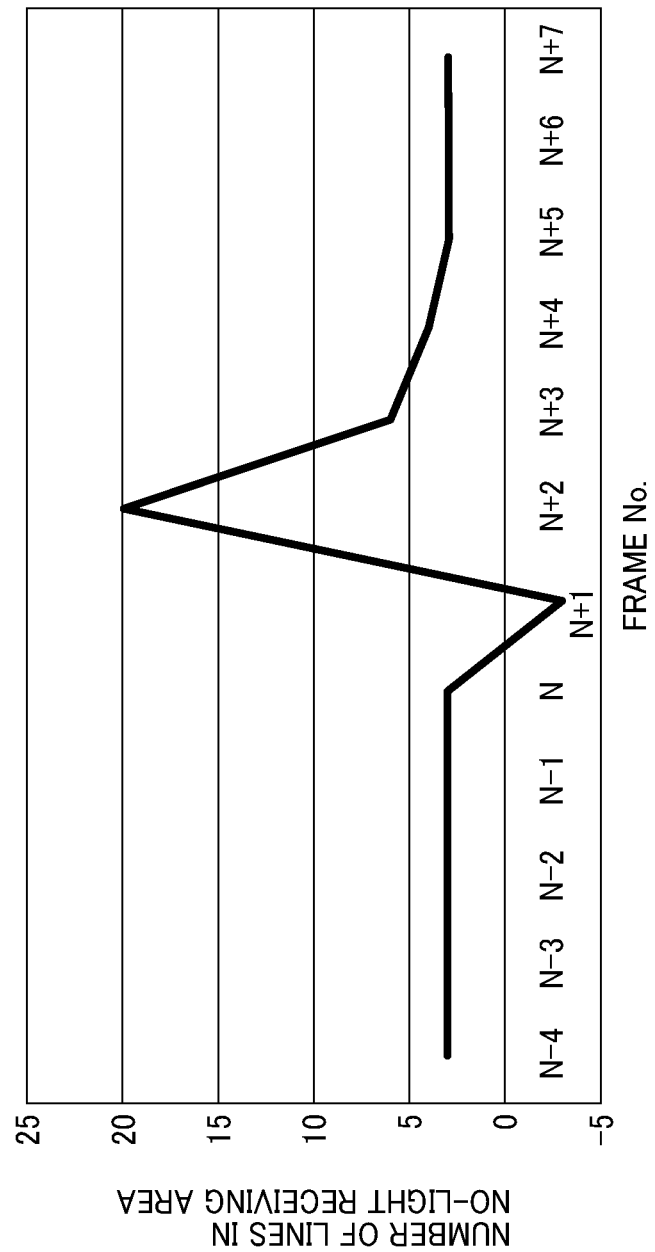
FIG. 26 is a sixth graph of the changes in size of a no-light receiving area included in a detection image area, according to an embodiment of the present disclosure.

FIG. 26 is a sixth graph of the changes in size of the no-light receiving area G4 included in the detection image area G3, according to the present embodiment.

Although vibration occurs in the N+1-th, N+2-th, and the N+3-th frames, the vibration is detected in the N+1-th frame, and the number-of-lines in the no-light receiving area G4 returns to 20 lines in the N+2-th frame. In other words, FIG. 26 illustrates that the number-of-lines in the no-light receiving area G4 is successfully reduced from the N+2-th frame where vibration is still taking place.

As described above, according to the third embodiment of the present disclosure, even when vibration occurs, the impact on the amplitude control of the mirror 130 is reduced, and the size of the no-light receiving area G4 is reduced again due to the controlling processes after the vibration ceases. Due to such a configuration, stray light can be prevented from occurring. Alternatively, the length of convergence time may be made longer by reducing the gain value during the oscillation.

In the above embodiments of the present disclosure, how the size of the no-light receiving area G4 in the sub-scanning direction is changed is described. In the above embodiments of the present disclosure, when the size of the no-light receiving area G4, which is a part of the detection image area G3, in the sub-scanning direction is reduced, the size of the detection image area G3 in the sub-scanning direction is eventually reduced. In other words, it can be said that the size of the no-light receiving area G4 in the sub-scanning direction is changed in the above embodiments of the present disclosure so as to vary the size of the detection image area G3 in the sub-scanning direction.

In the embodiments of the present disclosure as described above, a configuration is described in which the detection image area G3 on which a detection image is formed includes the end of the light receiver 61 on the scanning-starting side in the sub-scanning direction. However, no limitation is intended thereby to such a configuration in which the detection image area G3 includes the end of the light receiver 61 on the scanning-starting side in the sub-scanning direction at all times. For example, as described above according to the third embodiment of the present disclosure, even if there is some moment in which the end of the light receiver 61 on the scanning-starting side in the sub-scanning direction is not included in the detection image area G3 on a temporary basis due to, for example, vibration or failure, it is satisfactory in design as long as the detection image area G3 on which a detection image is to be formed includes the end of the light receiver 61 on the scanning-starting side in the sub-scanning direction.

In the embodiments of the present disclosure as described above, the formation of the scanning area G is described on condition that the scanning light that is emitted from the light deflector 13 scans the plane that includes a surface of the screen 15. However, no limitation is intended thereby. For example, when a reflection mirror is disposed on the optical path between the light deflector 13 and the screen 15, the scanning area G is formed also on the reflection mirror, and the scanning area G is formed also on the plane that is scanned by the scanning light reflected by the reflection mirror.

At least, the image displaying area G1 is formed on the screen 15 in the end, but it is not necessary for all the scanning area G to reach the plane that includes the surface of the screen 15. For example, the detection image area G3 may be formed so as to include at least some of the light receiver 61 that is disposed before the detection image area G3 reaches the plane including the surface of the screen 15. Alternatively, the detection image area G3 may be reflected by the reflection mirror before the detection image area G3 reaches the plane including the surface of the screen 15, and may be formed so as to include at least some of the light receiver 61 that is arranged ahead in the direction of the reflection.

Figure 27:
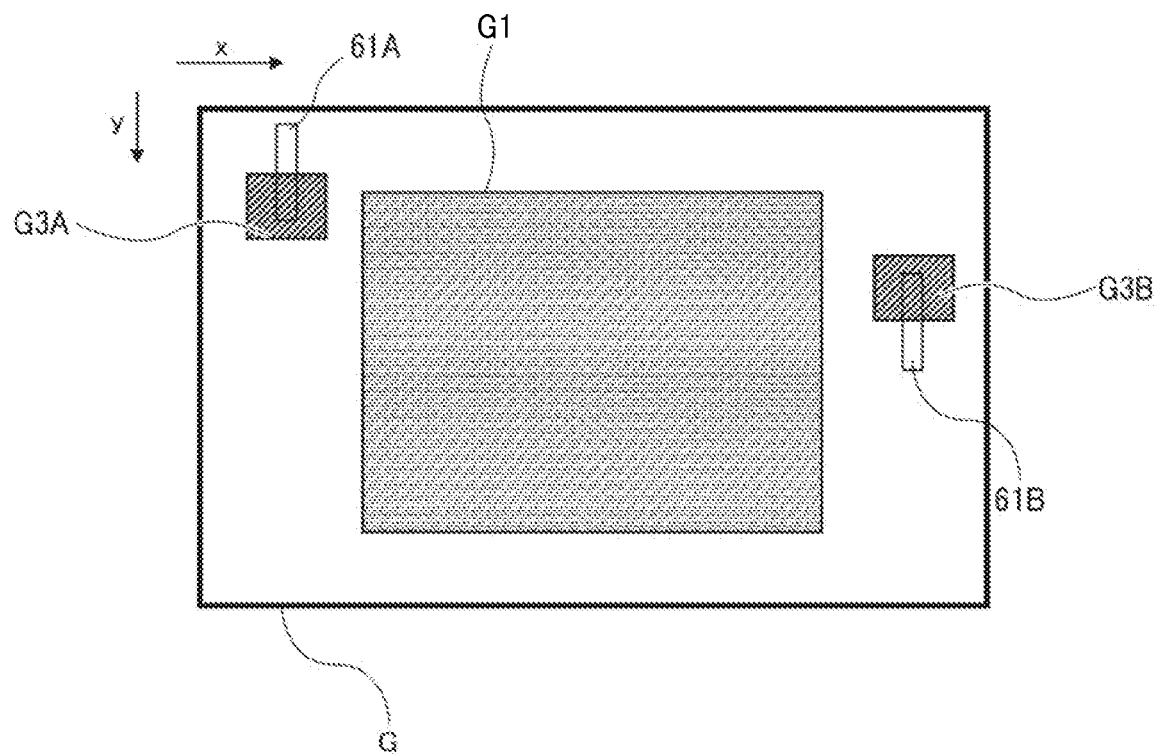
FIG. 27 is a diagram illustrating the relative positions of light receivers and detection image areas, according to an embodiment of the present disclosure.

In the embodiments of the present disclosure as described above, cases in which the number of combinations of the light receiver 61 and the detection image area G3 is one are described as illustrated in FIG. 8. However, no limitation is indicated thereby, and there may be two or more number of combinations of the light receiver 61 and the detection image area G3. For example, FIG. 27 is a diagram illustrating a case in which the relative positions of light receivers 61A and 61B and detection image areas G3A and G3B have two different combination patterns, according to the present embodiment. As illustrated in FIG. 27, two light receivers including the light receivers 61A and 61B are provided for the screen 15. The position at which the detection image area G3A is formed with respect to the light receiver 61A and the position at which the detection image area G3B is formed with respect to the light receiver 61B are designed according to, for example, the optical layout of the display device 100, the size of the image displaying area G1, and the controlling processes that are performed based on the result of the detection performed by the light receivers 61A and 61B. In this configuration, the detection image area G3A includes, at least, the end of the light receiver 61A opposite the end of the light receiver 61A on the scanning-starting side in the sub-scanning direction. On the other hand, the detection image area G3B includes, at least, the end of the light receiver 61B on the scanning-starting side in the sub-scanning direction.

In the case of the detection image area G3B, compared with the detection image area G3A, the no-light receiving area G4 appears before the light receiver 61B detects the detection image area G3B. For this reason, for example, even when the stray light is reduced as the formation of a detection image is terminated at the timing when the light receiver 61 detects scanning light, the stray light to a display area occurs due to the no-light receiving area G4. Such stray light due to the no-light receiving area G4 can be reduced by reducing the size of the no-light receiving area, by reducing the size of the no-light receiving area G4 as in the embodiments of the present disclosure.

As illustrated in FIG. 27, the scanning can be controlled with a high degree of precision with a combination of two different patterns of relative positions of the light receiver 61 and the detection image area G3 on the single screen 15. In such a configuration, a high-quality display image with no stray light can be obtained by performing the stray-light controlling processes that are suitable for the relative positions of the light receiver 61 and the detection image area G3.

FIG. 28A, FIG. 28B, FIG. 28C, and FIG. 28D are fourth diagrams each illustrating the changes in size of the no-light receiving area G4 included in the detection image area G3, according to the present embodiment.

Figure 28A:
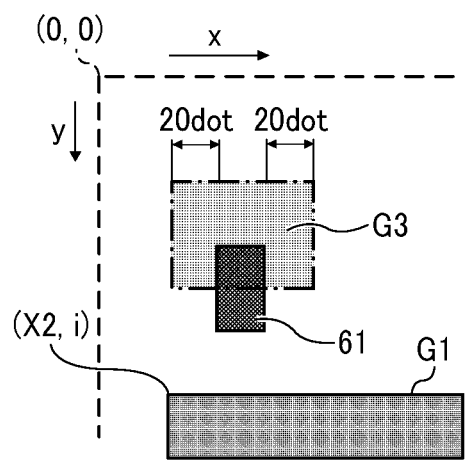
FIG. 28A, FIG. 28B, FIG. 28C, and FIG. 28D are fourth diagrams each illustrating the changes in size of a no-light receiving area included in a detection image area, according to an embodiment of the present disclosure.
Figure 28B:
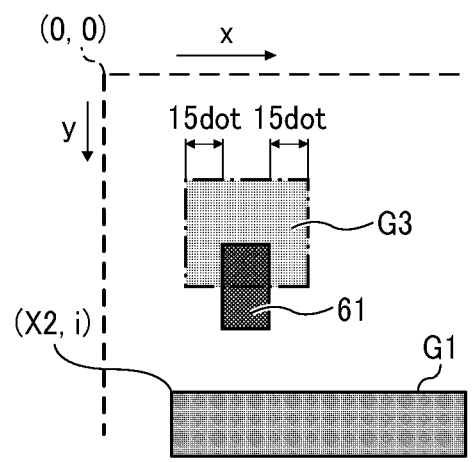

In the above description with reference to FIG. 17A, FIG. 17B, FIG. 17C, and FIG. 17D, the size of the detection image area G3 and the no-light receiving area G4 in the sub-scanning direction is reduced. However, no limitation is indicated thereby, and as illustrated in FIG. 28A, FIG. 28B.

Figure 28C:
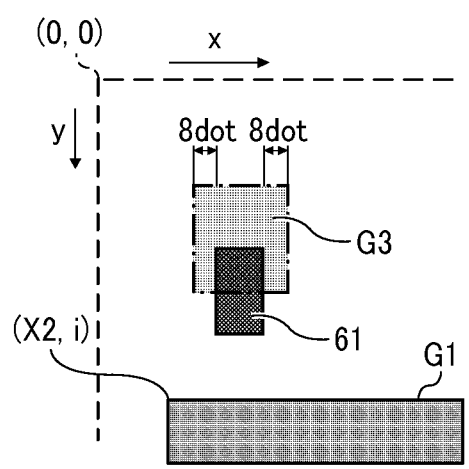
Figure 28D:
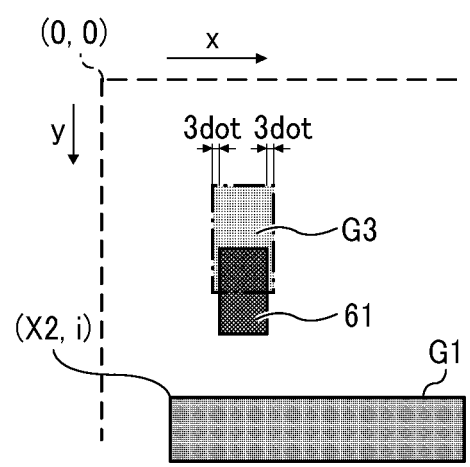

FIG. 28C, and FIG. 28D, the size of the detection image area G3 and the no-light receiving area G4 in the main scanning direction may be reduced.

As illustrated in FIG. 28A, FIG. 28B, FIG. 28C, and FIG. 28D, the detection image area G3 includes both ends of the light receiver 61 and the detection field in the main scanning direction.

FIG. 28A, FIG. 28B, FIG. 28C, and FIG. 28D illustrate a state in which "dot" indicating the size of the no-light receiving area G4 decreases to 6dot, i.e., the target dot number, from 40dot to 30dot, then to 16dot, and then to 6dot in the order listed. Due to such a configuration, the size of the no-light receiving area G4 of the detection image area G3 in the main scanning direction is reduced to the target dot number, and the stray light due to the no-light receiving area G4, which may affect a display image, can efficiently be controlled.

The changes in size as described above with reference to FIG. 22A, FIG. 22B, FIG. 22C. FIG. 22D, and FIG. 22E, and FIG. 25A, FIG. 25B, FIG. 25C, FIG. 25D, and FIG. 25E may be performed in the main scanning direction as illustrated in FIG. 28A, FIG. 28B, FIG. 28C, and FIG. 28D. In other words, the light receiver 61 and the detection field overlap with the detection image area G3, but when the ends of the light receiver 61 and the detection field in the main scanning direction go out of the detection image area G3, the size of the detection image area G3 may be increased such that the detection image area G3 includes the ends of the light receiver 61 and the detection field in the main scanning direction. Due to such a configuration, the scanning light that scans the detection field can be detected by the light receiver 61 with reliability.

As described above, the display device (optical scanner) 100 according to an embodiment of the present disclosure includes the light deflector 13 that deflects the light emitted from the light-source device (light source) 11 to scan the scanning area G two-dimensionally in the main scanning direction and the sub-scanning direction, and the light receiver (photodetector) 61 that detects the scanning light used by the light deflector 13 to perform scanning on a detection field included in the scanning area G that is two-dimensionally scanned. In the scanning area G, the detection image area (detection scanning area) G3 is formed by the scanning light so as to partially overlap with the detection field and include an end of the detection field. Moreover, the size of the detection image area G3 in the main scanning direction or the sub-scanning direction is changed.

Due to such configurations as described above, the scanning light that forms the detection image area G3 so as to include an end of the detection field to scan a detection field can be detected by the light receiver 61 with reliability, and the unnecessary light in the no-light receiving area G4 of the detection image area G3, excluding the detection field, can be reduced.

The display device 100 reduces the size of the detection image area G3 so as to reduce the size of the no-light receiving area G4. By so doing, the unnecessary light in the no-light receiving area G4 can be reduced.

In the display device 100, the light receiver 61 and the detection field overlap with the detection image area G3. However, when the ends of the detection field go out of the detection image area G3, the size of the detection image area G3 may be increased such that the detection image area G3 includes the ends of the detection field. Due to such a configuration, the scanning light that scans the detection field can be detected by the light receiver 61 with reliability.

Even when the light receiver 61 and the detection field does not overlap with the detection image area G3, the size of the detection image area G3 may be increased such that the detection image area G3 includes the ends of the detection field. Due to such a configuration, the scanning light that scans the detection field can be detected by the light receiver 61 with reliability.

In the display device 100, the scanning light forms an image based on the image data, within range of the image displaying area G1 included in the scanning area G. In such a configuration, the stray light due to the unnecessary light in the no-light receiving area G4, which may affect a display image, can efficiently be controlled.

The display device 100 includes the screen 15 that is scanned by the scanning light deflected by the light deflector 13, and forms an image within range of the image displaying area G1 on the screen 15. Alternatively, the display device 100 is not provided with the screen 15, and an image may be formed within range of the image displaying area G1 on a screen that is arranged outside the display device 100.

The display device 100 includes the light-source device 11 and the controller 17 that outputs a control signal to the light deflector 13, and the controller 17 outputs a control signal to the light-source device 11 and the light deflector 13 such that the size of the detection image area G3 will be controlled within a prescribed range.

Once scanning light is detected, the light receiver 61 outputs a light signal. After the light deflector 13 starts performing scanning in the sub-scanning direction, the controller 17 outputs a control signal based on the difference between the detection starting point that is the position in the sub-scanning direction at the timing when the light signal S1 is received from the light receiver 61 for the first time and the area starting point that is the starting point of the detection image area G3 in the sub-scanning direction.

The controller 17 amplifies the difference to generate an amplified difference, and adds up amplified differences to generate a cumulative added value. Then, the controller 17 updates the area starting point based on the cumulative added value.

The position in the sub-scanning direction is defined by partition numbers that divide the range of an object to be controlled in the sub-scanning direction into a predetermined number of partitions, and the rate of amplification is determined based on the scanning cycle in the two-dimensional scanning and the number of partitions. When the difference takes on a negative value, the cumulative added value is set to zero.

The display system 1 according to an embodiment of the present disclosure includes the display device 100, the free-form surface mirror (imaging optical system) 30 that reflects the projection light projected from the screen 15 that is scanned by the scanning light deflected by the light deflector 13, and the front windshield (reflector) 50 that reflects the reflection light reflected by the free-form surface mirror 30. The free-form surface mirror 30 reflects the projection light towards the front windshield 50 to form a virtual image.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present disclosure may be embodied in the form of a computer program stored on any kind of storage medium. Examples of storage media include, but are not limited to, flexible disks, hard disks, optical discs, magneto-optical discs, magnetic tape, nonvolatile memory cards. ROM, etc. Alternatively, any one of the above-described and other methods of the present disclosure may be implemented by ASICs, prepared by interconnecting an appropriate network of conventional component circuits, or by a combination thereof with one or more conventional general-purpose microprocessors and/or signal processors programmed accordingly.

The hardware platform includes any desired kind of hardware resources including, for example, a CPU, a RAM, and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An optical scanner comprising:
   a light source to emit light;
   a light deflector to deflect the light emitted from the light source to scan a scanning area two-dimensionally in a main scanning direction and a sub-scanning direction by scanning light, the scanning area including a detection field;
   a photodetector to detect the scanning light deflected by the light deflector, the detection field overlapping the photodetector;
   circuitry configured to determine a size of the detection field; and
   circuitry configured to set the size of the detection field which is scanned using the size of the detection field which has been determined.

2. The optical scanner according to claim 1, further comprising:
   a detection scanning area,
   wherein the detection field is where the detection scanning area overlaps the photodetector, and
   wherein a size of the detection scanning area is reduced to reduce a size of a part of the detection scanning area excluding the detection field.

3. The optical scanner according to claim 1, further comprising:
   a detection scanning area,
   wherein the detection field is where the detection scanning area overlaps the photodetector, and
   wherein, when an end of the detection field goes out of the detection scanning area, a size of the detection scanning area is increased to include the end of the detection field.

4. The optical scanner according to claim 1, wherein the scanning light forms an image based on image data, within range of an image area included in the scanning area.

5. The optical scanner according to claim 4, further comprising:
   a screen on which the scanning light is scanned by the light deflector,
   wherein an image is formed within range of the image area on the screen.

6. The optical scanner according to claim 1, further comprising:
   a detection scanning area, wherein the detection field is where the detection scanning area overlaps the photodetector; and
   circuitry configured to output a control signal to the light source and the light deflector,
   wherein the circuitry outputs a control signal to the light source and the light deflector to control a size of the detection scanning area to within a prescribed range.

7. A display system comprising:
   an optical scanner including
   a light source to emit light,
   a light deflector to deflect the light emitted from the light source to scan a scanning area two-dimensionally in a main scanning direction and a sub-scanning direction to form the image on a surface by scanning light, the scanning area including a detection field, and
   a photodetector to detect the scanning light deflected by the light deflector, the detection field overlapping the photodetector;
   an imaging optical system to reflect projection light projected from a screen on which the scanning light is scanned by the light deflector;
   a reflector to reflect reflection light reflected by the imaging optical system;
   circuitry configured to determine a size of the detection field; and
   circuitry configured to set the size of the detection field which is scanned using the size of the detection field which has been determined,
   wherein the imaging optical system projects the projection light towards the reflector to form a virtual image.

8. A mobile object comprising:
   the display system according to claim 7,
   wherein the reflector is a front windshield.

9. The display system according to claim 7, further comprising:
   a detection scanning area,
   wherein the detection field is where the detection scanning area overlaps the photodetector, and
   wherein a size of the detection scanning area is reduced to reduce a size of a part of the detection scanning area excluding the detection field.

10. The display system according to claim 7, further comprising:
    a detection scanning area,
    wherein the detection field is where the detection scanning area overlaps the photodetector, and
    wherein, when an end of the detection field goes out of the detection scanning area, a size of the detection scanning area is increased to include the end of the detection field.

11. The display system according to claim 7, wherein the scanning light forms an image based on image data, within range of an image area included in the scanning area.

12. The display system according to claim 11, further comprising:
a screen on which the scanning light is scanned by the light deflector,
wherein an image is formed within range of the image area on the screen.

13. The display system according to claim 7, further comprising:
a detection scanning area, wherein the detection field is where the detection scanning area overlaps the photodetector; and
circuitry configured to output a control signal to the light source and the light deflector,
wherein the circuitry outputs a control signal to the light source and the light deflector to control a size of the detection scanning area to within a prescribed range.

14. A method of controlling optical scanning, performed by an optical scanner including
a light source to emit light,
a light deflector to deflect the light emitted from the light source to scan a scanning area two-dimensionally in a main scanning direction and a sub-scanning direction by scanning light, the scanning area including a detection field,
a photodetector to detect the scanning light deflected by the light deflector the detection field overlapping the photodetector, the method comprising:
determining a size of the detection field;
setting a size of the detection scanning area using the size of the detection field which has been determined; and
scanning, using the light source and light deflector, the scanning area and the detection field.

15. A computer-readable non-transitory recording medium storing a program for causing a computer to execute the method according to claim 14.

* * * * *